United States Patent
Akai et al.

(10) Patent No.: US 9,250,740 B2
(45) Date of Patent: Feb. 2, 2016

(54) CAPACITIVE TOUCH PANEL DEVICE WITH DIFFERING DRIVE PULSE WIDTHS

(71) Applicant: Synaptics Display Devices GK, Tokyo (JP)

(72) Inventors: Akihito Akai, Tokyo (JP); Tatsuya Ishii, Tokyo (JP); Kazuo Okado, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 73 days.

(21) Appl. No.: 14/037,707

(22) Filed: Sep. 26, 2013

(65) Prior Publication Data

US 2014/0092061 A1   Apr. 3, 2014

(30) Foreign Application Priority Data

Sep. 28, 2012 (JP) ................................ 2012-216745

(51) Int. Cl.
G06F 3/044 (2006.01)
G06F 3/041 (2006.01)

(52) U.S. Cl.
CPC .............. *G06F 3/0416* (2013.01); *G06F 3/044* (2013.01); *G06F 3/0418* (2013.01)

(58) Field of Classification Search
CPC ............................................ G06F 3/041–3/047
See application file for complete search history.

(56) References Cited

U.S. PATENT DOCUMENTS

| 5,684,505 A * | 11/1997 | Takita et al. ................... 345/104 |
| 7,830,157 B2 * | 11/2010 | Geaghan .................. G01D 5/24 324/658 |
| 8,456,434 B2 * | 6/2013 | Moon ................... G06F 3/0418 345/156 |
| 8,525,798 B2 * | 9/2013 | Peterson ............... G06F 3/0416 345/156 |
| 2007/0257890 A1 | 11/2007 | Hotelling et al. |
| 2009/0095542 A1 * | 4/2009 | Moon ..................... G06F 3/044 178/18.06 |
| 2009/0167325 A1 * | 7/2009 | Geaghan .................. G01D 5/24 324/660 |
| 2010/0212975 A1 * | 8/2010 | Moon ................... G06F 3/0418 178/18.06 |
| 2012/0043140 A1 * | 2/2012 | Peterson ............... G06F 3/0416 178/18.06 |
| 2013/0082977 A1 * | 4/2013 | Noguchi et al. ............... 345/174 |

FOREIGN PATENT DOCUMENTS

JP   2009-535742 A   10/2009

* cited by examiner

*Primary Examiner* — Gene W Lee
(74) *Attorney, Agent, or Firm* — Miles & Stockbridge P.C.

(57) ABSTRACT

It becomes possible to use drive pulses having different pulse widths for one kind of drive pulse signal period. Therefore, even if a voltage acting on a crossing part of drive and detection electrodes is periodically changed through a stray capacitance attributed to an external object such as a finger in an undesired manner, the pulse width of the drive pulse is never fixed with respect to the period, and the periodic buildup of a certain voltage on a detection signal, which would make appreciable noise, is suppressed. Thus, the reduction of detection signals can be suppressed in quantity without switching the pulse signal frequency of the drive pulse of a touch panel.

13 Claims, 20 Drawing Sheets

[ a: X-Ray VHSP CHARGE (Not detected), b: Detected ]

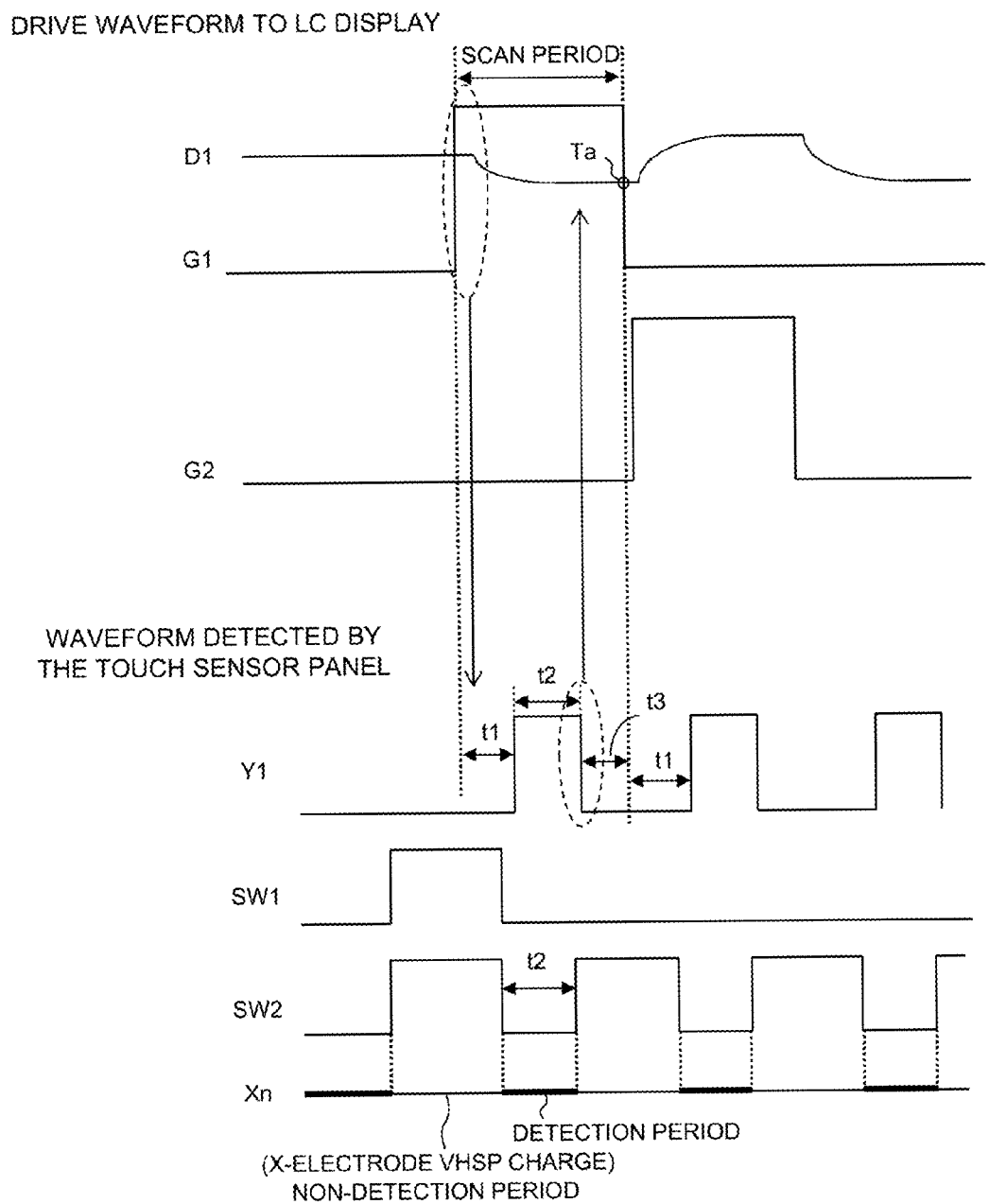

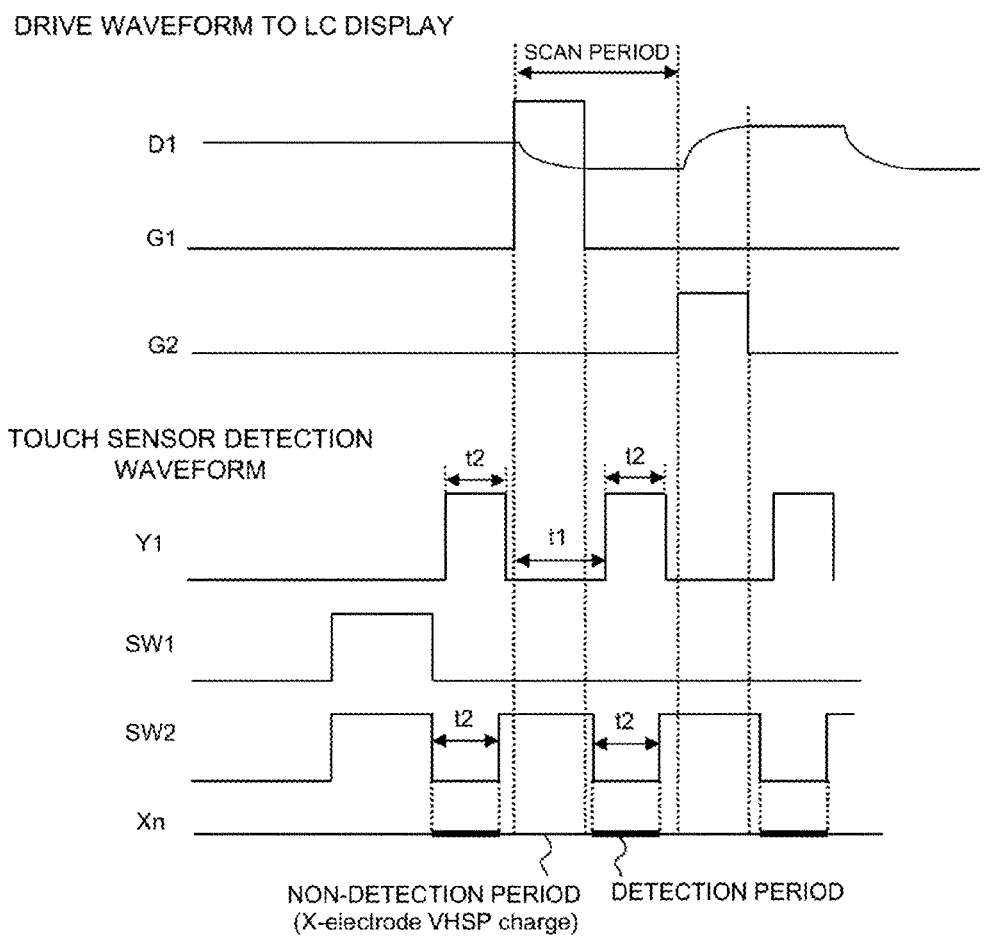

CAPACITIVE TOUCH PANEL DEVICE WITH DIFFERING DRIVE PULSE WIDTHS

CROSS-REFERENCE TO RELATED APPLICATIONS

The Present application claims priority from Japanese application JP 2012-216745 filed on Sep. 28, 2012, the content of which is hereby incorporated by reference into this application.

BACKGROUND

The present invention relates to a semiconductor device having a touch panel controller for controlling a touch panel, and an electronic device having a touch panel controller and a microprocessor.

An electrostatic capacitance type touch panel has been in widespread use as an input device of PDA (Personal Digital Assistant), a tablet PC (Personal computer) or the like. Especially, a mutual capacitance-type touch panel which enables a multi-touch detection includes: a plurality of drive electrodes; a plurality of detection electrodes; and a plurality of crossing parts formed by the drive electrodes and the detection electrodes, wherein a fluctuation in capacitive coupling state at each crossing part can be obtained by means of signals taken, in turn, from the detection electrodes when the drive electrodes are driven by use of a pulse in turn. Calculating the coordinates of a position where the capacitance fluctuation is caused, which crossing part the stray capacitance has been changed on, i.e. which crossing part a finger has approached or touched can be known.

International Patent Publication No. JP-T-2009-535742 includes the description for the reduction of noise in the detection cycle of an electrostatic capacitance type touch panel. Specifically, it is preferable for the purpose of noise rejection to drive a touch panel by means of drive pulses having different frequencies. Noise which is present in a drive pulse of a certain drive frequency is not involved in a drive pulse of another frequency. For instance, it suffices to perform the detecting action with drive pulses of three drive frequencies, and then to adopt, from results thereof, one which is the smallest in the influence of noise.

SUMMARY

The inventor has focused on a concrete event that noise is actualized depending on the frequency of a drive pulse signal of a touch panel. Specifically, it has been found that the execution of a touch-detection cycle in the middle of the action of charging a device such as PDA with a touch panel incorporated therein by an AC charger can worsen the ability of detection. As a result of further study concerning it, it is also found that there are many AC chargers such that the output voltage vibrates together with AC charger local ground voltage at a predetermined frequency, and the frequency varies depending on the charging condition. The trend like this is particularly obvious for cheap AC chargers. Observing the global ground outside the AC charger and the touch panel with respect to the local ground, the fact that the power source and the local ground are vibrating in this way represents that the global ground is vibrating at the above frequency. Therefore, if a finger which electrically connects with the global ground approaches a crossing part, the surface voltage working on the crossing part through a stray capacitance produced by the finger is periodically changed in synchronization with the frequency. Depending on the relation between the cycle of the frequency vibration and the pulse width of a drive pulse driving a drive electrode, specifically when the cycle of the vibration becomes coincident with the cycle of the drive pulse signal or an integer multiple thereof, a certain voltage is applied to the detection circuit periodically or as cumulated, which results in noise worsening the detection accuracy.

The technique disclosed in JP-T-2009-535742 can be also applied to the worsening of the detection accuracy (AC charger problem). However, it became clear from the study made by the inventor that when the drive pulse signal is switched among two or more cycles to drive a touch panel, noise can be rather increased by changing the frequency. The true worth of a touch panel used for PDA or the like as an input device comes into play when placed on a display device such as a liquid crystal display. Also, a display device such as a liquid crystal display has scan electrodes and signal electrodes, which are arranged in vertical and horizontal directions as in a touch panel, and a switch element disposed at each intersecting point of the scan and signal electrodes; the switch element is driven by a pulse through the scan electrode. It is considered that when the time of change of the scan pulse falls on a pulse period of a drive pulse of the touch panel, noise resulting from the changes of the scan and signal electrodes affects a detection signal, thereby lowing the accuracy of detection by a touch. In light of such circumstances, the applicant had suggested that the pulse signal frequency of the drive pulse be determined so as to avoid the coincidence in pulse-change timing between a drive pulse of a touch panel and a scan pulse of a display. Under the circumstances, there is no chance of the technique as described in JP-T-2009-535742 being adopted.

The invention was made in view of the above circumstances. It is an object of the invention to make possible to suppress the reduction in the detection signal quantity without switching the pulse signal frequency of a drive pulse of a touch panel in a case where a voltage which works on an crossing part of drive and signal electrodes of a touch panel is periodically changed through a stray capacitance produced by an external object such as an finger as typified by the AC charger problem.

The above and other problems and novel features of the invention will become apparent from the description hereof and the accompanying drawings.

Of the embodiments herein disclosed, a representative embodiment will be briefly outlined below.

The drive circuit operable to output drive pulses to drive electrodes of a touch panel has more than one kind of outputtable pulse widths for each kind of pulse signal periods of the outputtable drive pulses. Specifically, in the first embodiment, the drive circuit outputs drive pulses with two or more pulse widths mixed for each drive electrode. In the second embodiment, the pulse width of the drive pulse is changed, thereby outputting more than one kind of drive pulses to each drive electrode; detection data at each crossing part of the drive and detection electrodes are produced for each pulse width of the drive pulses; and one piece of detection data is selected as optimal data for each crossing part. In the third embodiment, more than one kind of pulses are previously supplied through a capacitance-connecting node connected to an input stage of the detection circuit, whereby an optimal pulse width is decided by use of data detected in a spurious way, and a drive pulse is output to drive electrodes with the decided pulse width.

The effect that the representative embodiment herein disclosed brings about is briefly as followed.

It becomes possible to use drive pulses having different pulse widths for a signal period of the drive pulse. Therefore, even if a voltage acting on a crossing part of drive and detection electrodes through a stray capacitance attributed to an external object such as a finger is periodically changed in an undesired manner, the pulse width of the drive pulse is never fixed with respect to the period, and the periodic buildup of a certain voltage on a detection signal, which would make appreciable noise, is reduced. Therefore, in the approach to the AC charger problem or the like, the reduction in detection signals in quantity can be suppressed without the need for switching the drive pulse signal frequency of a touch panel, and the worsening of detection accuracy can be prevented.

BRIEF DESCRIPTION OF THE DRAWINGS

FIG. 11A is a waveform diagram exemplifying the waveforms of a scan pulse and a gradation voltage (signal voltage) which are supplied to a display panel, and the waveform of a drive pulse supplied to the touch panel;

FIG. 11B is a waveform diagram showing other examples of the waveforms of a scan pulse and a gradation voltage (signal voltage) supplied to the display panel, and the waveform of a drive pulse supplied to the touch panel;

DETAILED DESCRIPTION

1. Summary of the Embodiments

Figure 1:
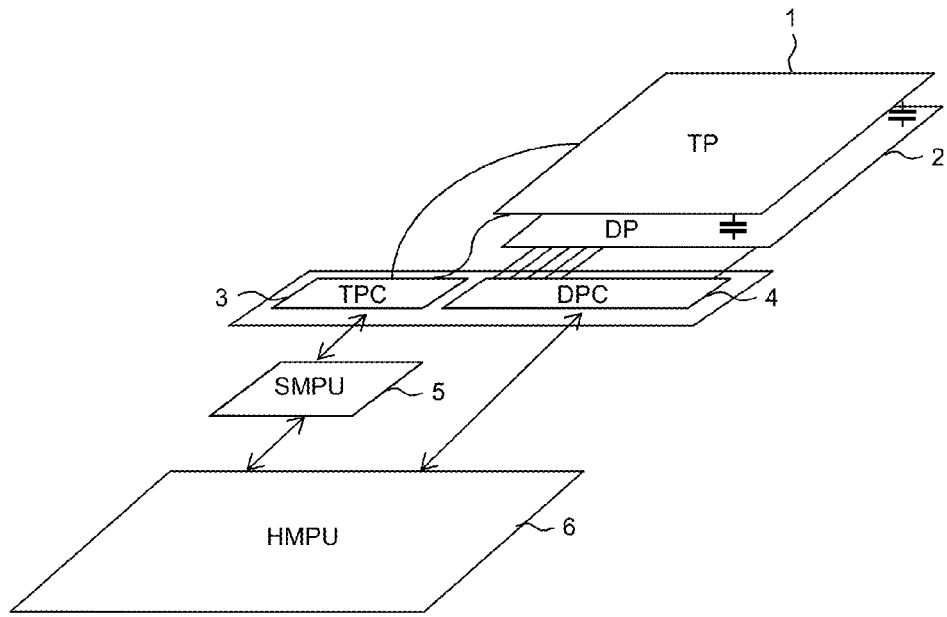
FIG. 1 is a block diagram exemplifying the whole structure of a display-and-input device, to which the present invention is applied.

The representative embodiment herein disclosed will be outlined first. In the outline about the representative embodiment, the reference numerals for reference to the drawings, which are accompanied with paired round brackets, only exemplify what the concepts of members or components referred to by the numerals involve.

[1] <The Drive Pulse has More than One Outputtable Pulse Width for Each Kind of Pulse Period>

A semiconductor device (3, 3A, 3B) according to the representative embodiment has a touch panel controller (3, 3A, 3B) for a touch panel (1) including: a plurality of drive electrodes (Y1 to YM); a plurality of detection electrode (X1 to XN); and a plurality of crossing parts formed by the drive and detection electrodes. The touch panel controller has: a drive circuit (300, 300A, 300B) which outputs drive pulses to drive terminals connected to the drive electrodes respectively in a predetermined order; and a detection circuit (310, 301_1-301_N, 301_n) which accepts signals arising from the detection electrodes in response to the drive pulses supplied to the drive electrodes, as inputs through detection terminals connected to the detection electrodes, and produces detection data corresponding to a fluctuation in capacitive coupling state at each crossing part. The drive circuit has more than one kind of outputtable pulse widths (TXH1, TXH2, TXH3) for each kind of pulse signal periods of the outputtable drive pulses.

According to this, it becomes possible to use drive pulses which are different in pulse width for each drive pulse signal period. Therefore, even if a voltage acting on a crossing part of drive and detection electrodes through a stray capacitance attributed to an external object such as a finger is periodically changed in an undesired manner, the pulse width of the drive pulse is never fixed with respect to the period, and the influence of a periodically vibrating voltage noise acting through the stray capacitance is reduced with the aid of the effect of evening out detecting actions by plural times of drive pulse input, whereby the periodic buildup of a certain voltage on a detection signal, which would make appreciable noise, is suppressed. Therefore, in regard to the AC charger problem and the like, the reduction in the amount of detection signals can be suppressed without switching the signal frequency of a drive pulse of a touch panel, and the detection accuracy can be prevented from worsening.

[2] <The Two or More Pulse Widths Mutually in the Prime-Number Relation>

In the semiconductor device as described in [1], the more than one kind of pulse widths are mutually in the prime-number relation.

The above embodiment is arranged to overcome the problem that when the period of application of a voltage which undesirably acts on an crossing part of the drive and detection electrodes through a stray capacitance produced by an external object such as an finger is coincident with the signal period of the drive pulse or an integer multiple thereof, a certain voltage is applied to the detection circuit periodically or as cumulated, making noise. The above embodiment allows the reduction or suppression of the cumulative buildup of such an undesired voltage component by making the pulse width of the drive pulse variable rather than changing the signal frequency of the drive pulse. Assuming that the period of the change in surface potential of a touched surface varies depending on the type of the AC charger as well as the charging status, which is typified by the AC charger problem, the occurrence of a situation that the cumulative buildup of an undesired voltage component cannot be mitigated can be prevented in advance by use of any of pulse widths which are in the prime-number relation with each other.

[3] <With More than One Kind of Pulse Widths Mixed>

In the semiconductor device as described in [1] or [2], the drive circuit (300) outputs drive pulses with more than one kind of pulse widths mixed for each drive terminal.
(Countermeasure Against AC Charger Noise in Connection with the First Embodiment)

According to this, when applying more than one drive pulse to each drive terminal to produce detection data of each crossing part, the occurrence of the cumulative buildup of an undesired voltage component can be prevented by all of the drive pulses even in the worst case scenario.

[4] <Detect Signals for Each Pulse Width by Outputting More than One Kind of Drive Pulses for Each Drive Terminal>

In the semiconductor device as described in [1] or [2], the drive circuit (300A) changes the pulse width of the drive pulse, thereby outputting more than one kind of drive pulses to each drive terminal; and the detection circuit (301_1 to 301_N, see FIG. 24) produces detection data corresponding to a fluctuation in capacitive coupling state at each crossing part for each pulse width of the drive pulses. (Countermeasure against AC charger noise in connection with the second embodiment)

According to this, the pulse width of the drive pulse is changed, thereby outputting more than one kind of drive pulses to each drive electrode, and detection data at each crossing part of the drive and detection electrodes are produced for each pulse width of the drive pulses. Therefore, the processing unit operable to process detection data can select a piece of detection data which is smaller in noise component from detection data for each pulse width produced on each crossing part to use it as optimal data.

[5] <Select a Pulse Width Following Direction Based on Data Acquired by Use of Known Capacitance-Connecting Node>

The semiconductor device as described in [1] or [2] further includes: a capacitance-connecting node (CND) at which an output of a buffer (335) is connected to an input stage of the detection circuit (301_n, see FIG. 28) through a capacitance (CC); and a control circuit (308B). Before outputting the drive pulses to the drive terminals, the control circuit controls the buffer to output more than one kind of pulses having the same pulse widths as those of the drive pulses, controls the detection circuit to produce pseudo detection data in response to signals supplied through the capacitance-connecting node, and controls the drive circuit to output a drive pulse having a pulse width decided based on the pseudo detection data. (Countermeasure against AC charger noise in connection with the third embodiment)

According to this, in the processing unit operable to process detection data, the following are made possible on condition that more than one kind of pulses are previously supplied through the capacitance-connecting node connected to the input stage of the detection circuit: to decide an optimal pulse width which achieves a smaller noise component by use of data detected in a spurious way; and to cause the drive circuit to output a drive pulse having the decided width to drive electrodes from drive terminals. Especially, the capacitance value of the capacitance-connecting node is known and as such, a judgment on whether or not there is the influence of the certain voltage added to pseudo detection data periodically or as cumulated can be made with relative ease.

[6] <Capacitive Coupling Node Doubling as a Calibration Node>

In the semiconductor device as described in [5], the capacitance-connecting node is also used as an addition node for adding up, for each crossing part, calibration signals for equalizing reference values of conversion targets with respect to a conversion range of a conversion circuit operable to convert an input signal of the detection circuit into a digital signal.

According to this, the arrangement of an addition node for calibration can be diverted and therefore, the increase in the circuit scale can be suppressed.

[7] <Creation of Pseudo Detection Data for Each Detection Frame>

In the semiconductor device as described in [5], the control circuit controls the drive circuit to go through a circuit of drive pulse outputs to all the drive terminals, and forces the detection circuit to create the pseudo detection data for each detection frame for creating detection data on all the crossing parts.

According to this, the detection period for determining the pulse width of the drive pulse can be reduced roughly to 1/M (M is the number of drive electrodes) of the touch-detection time of the touch panel in comparison to that in the semiconductor device as described in [4].

[8] <Relation Between Scan Pulse and Drive Pulse of Display Controller>

The semiconductor device as described in any one of [1] to [6] further includes: a display controller (4) which outputs a scan pulse to each scan electrode of an active matrix type display panel (2) and a signal voltage to each signal electrode, provided that the active matrix type display panel (2) has a plurality of scan electrodes (G1 to G640), a plurality of signal electrodes (D1 to D1440), and a plurality of display cells each disposed at each intersection of the scan and signal electrodes. The period and pulse width of the drive pulse are decided so that the pulse-change timing of the drive pulse does not conform to that of the scan pulse.

According to this, the touch panel is not affected by noise attributed to the change in the scan pulse of the display panel, and the change in signal electrode because of the relation between the drive and scan pulses. Since the drive circuit has more than one kind of pulse widths outputtable to the drive electrodes for the predetermined period, there is not the noise influence on detection data as typified by the AC charger problem even if the signal period of the drive pulse is kept a predetermined period in order to retain the relation between the drive and scan pulses.

[9] <Drive Pulse Having More than One Kind of Outputtable Pulse Widths for Each Kind of Pulse Period>

An electronic device according to another embodiment has: a touch panel controller (3, 3A, 3B) for a touch panel (1) having a plurality of drive electrodes, a plurality of detection electrodes, and a plurality of crossing parts formed by the drive and detection electrodes; and a processor (5) connected with the touch panel controller. The touch panel controller includes: a drive circuit (300, 300A, 300B) which outputs drive pulses to drive terminals connected to the drive electrodes respectively in a predetermined order; and a detection circuit (310, 301_1 to 301_N, 301_n) which accepts signals arising from the detection electrodes in response to the drive pulses supplied to the drive electrodes, as inputs through detection terminals connected to the detection electrodes, and produces detection data corresponding to a fluctuation in capacitive coupling state at each crossing part. The drive circuit has more than one kind of outputtable pulse widths (TXH1, TXH2, TXH3) for each kind of pulse signal periods of the outputtable drive pulses. The processor calculates coordinates of a touch position, that is, a position of the crossing part showing a larger fluctuation in capacitance based on detection data detected by the detection circuit.

According to this, it becomes possible to use drive pulses which are different in pulse width for each drive pulse signal period. Therefore, even if a voltage acting on a crossing part of the drive and detection electrodes is periodically changed through a stray capacitance attributed to an external object such as a finger in an undesired manner, the pulse width of the drive pulse is never fixed with respect to the period, and the influence of a periodically vibrating voltage noise acting through the stray capacitance is reduced with the aid of the effect of evening out detecting actions by plural times of drive pulse input, whereby the periodic buildup of a certain voltage on a detection signal, which would make appreciable noise, is suppressed. Therefore, in regard to the AC charger problem and the like, the reduction in the amount of detection signals can be suppressed without switching the signal frequency of a drive pulse of a touch panel, and the detection accuracy can be prevented from worsening.

[10] <The Two or More Pulse Widths Mutually in the Prime-Number Relation>

In the electronic device as described in [9], the more than one kind of pulse widths are mutually in the prime-number relation.

According to this, when assuming that the period of the change in surface potential of a touched surface varies depending on the type of the AC charger as well as the charging status, which is typified by the AC charger problem, the occurrence of a situation that the cumulative buildup of an undesired voltage component cannot be mitigated can be prevented in advance by use of any of pulse widths which are in the prime-number relation with each other.

[11] <With More than One Kind of Pulse Widths Mixed>

In the electronic device as described in [9] and [10], the drive circuit (300) outputs drive pulses with more than one kind of pulse widths mixed for each drive terminal. (Countermeasure against AC charger noise in connection with the first embodiment).

According to this, when applying more than one drive pulse to each drive terminal to produce detection data of each crossing part, the occurrence of the cumulative buildup of an undesired voltage component can be prevented by all of the drive pulses even in the worst case scenario.

[12] <Signal Detection for Each Pulse Width by Outputting More than One Kind of Drive Pulses to Each Drive Terminal>

In the electronic device as described in [9] and [10], the drive circuit (300A) changes the pulse width of the drive pulse, thereby outputting more than one kind of drive pulses to each drive terminal; and the detection circuit (301_1 to 301_N, 301_n) produces detection data corresponding to a fluctuation in capacitive coupling state at each crossing part for each pulse width of the drive pulses. The processor (5) determines, based on detection data detected by the detection circuit, a capacitance change at each crossing part for each pulse width of the drive pulse, and uses detection data obtained by the pulse width which minimizes the number of data involving a large fluctuation to calculate coordinates. (Countermeasure against AC charger noise in connection with the second embodiment, see FIG. 24)

According to this, the pulse width of the drive pulse is changed, thereby outputting more than one kind of drive pulses to each drive electrode, and detection data at each crossing part of the drive and detection electrodes are produced for each pulse width of the drive pulses. Therefore, the processor can select a piece of detection data which is smaller in noise component from detection data for each pulse width produced on each crossing part to use it as optimal data.

[13] <Select a Pulse Width Following Direction Based on Data Acquired by Use of Known Capacitance-Connecting Node>

In the electronic device as described in [9] and [10], the touch panel controller further includes: a capacitance-connecting node (CND) at which an output of a buffer (335) is connected to an input stage of the detection circuit (301_n) through a capacitance (CC); and a control circuit (308B). Before outputting the drive pulses to the drive terminals, the control circuit makes the buffer output more than one kind of pulses having the same pulse widths as those of the drive pulses, controls the detection circuit to produce pseudo detection data in response to signals supplied through the capacitance-connecting node. The processor identifies the pulse width which minimizes a difference between the pseudo detection data detected by the detection circuit and data in the case of the capacitance having a predetermined value, and notifies the control circuit of the identified pulse width. The control circuit controls the drive circuit to output drive pulses with the pulse width notified to the drive circuit. (Countermeasure against AC charger noise in connection with the third embodiment, see FIG. 28)

According to this, the processor operable to process detection data can decide an optimal pulse width which achieves a smaller noise component by use of data detected in a spurious way, and can operate the drive circuit to output a drive pulse having the pulse width thus decided to drive electrodes from drive terminals when previously supplied with more than one kind of pulses through the capacitance-connecting node connected to the input stage of the detection circuit. Especially, the capacitance value of the capacitance-connecting node is known and as such, a judgment on whether or not there is the influence of the certain voltage added to pseudo detection data periodically or as cumulated can be made with relative ease.

[14] <Capacitive Coupling Node Doubling as a Calibration Node>

In the electronic device as described in [13], the capacitance-connecting node is also used as an addition node for adding up, for each crossing part, calibration signals for equalizing reference values of conversion targets with respect to a conversion range of a conversion circuit operable to convert an input signal of the detection circuit into a digital signal.

According to this, the arrangement of an addition node for calibration can be diverted and therefore, the increase in the circuit scale can be suppressed.

[15] <Creation of Pseudo Detection Data for Each Detection Frame>

In the electronic device as described in [13], the control circuit controls the drive circuit to go through a circuit of drive pulse outputs to all the drive terminals, and forces the detection circuit to create the pseudo detection data for each detection frame for creating detection data on all the crossing parts.

According to this, the detection period for determining the pulse width of the drive pulse can be reduced roughly to 1/M (M is the number of drive electrodes) of the touch-detection time of the touch panel in comparison to that in the electronic device as described in [12].

[16] <Relation Between Scan Pulse and Drive Pulse of Display Controller>

The electronic device as described in any one of [9] to [15] further includes: a display controller (4) which outputs a scan pulse to each scan electrode of an active matrix type display panel (2) and a signal voltage to each signal electrode, provided that the active matrix type display panel (2) has a plurality of scan electrodes (G1 to G640), a plurality of signal electrodes (D1 to D1440), and a plurality of display cells each disposed at each intersection of the scan and signal electrodes. The period and pulse width of the drive pulse are decided so that the pulse-change timing of the drive pulse does not conform to that of the scan pulse.

According to this, the touch panel is not affected by noise attributed to the pulse change in the scan pulse and the change in signal electrode because of the relation between the drive and scan pulses. The frequency of the scan pulse is decided depending on the relation with a required display performance. Since the drive circuit has more than one kind of pulse widths outputtable to the drive electrodes for the predetermined period, there is not the noise influence on detection data as typified by the AC charger problem even if the signal period of the drive pulse is kept a predetermined period in order to retain the relation between the drive and scan pulses.

2. Further Detailed Description of the Embodiments

The embodiments will be described further in detail.

<<The Drive Pulse Waveform of the Touch Panel 1 to the Scan Pulse Waveform of the Display Panel 2>>

FIG. 1 exemplifies the whole structure of a display-and-input device, to which the invention is applied. The display-and-input device shown in the drawing is an embodiment of the electronic device according to the invention, which forms a part of a portable terminal device, e.g. PDA or a mobile phone, and has a touch panel (TP) 1, a display panel (DP) 2, a touch panel controller (TPC) 3 and a display controller (DPC) 4.

The touch panel 1 is a mutual capacitance-type touch panel which enables a multi-touch detection, and it has a plurality of drive electrodes (Y-electrodes), a plurality of detection electrodes (X-electrodes), and a plurality of crossing parts formed by the drive and detection electrodes. The touch panel controller 3 sequentially supplies the drive electrodes with a drive pulse and thus sequentially obtains signals from the detection electrodes. Based on the signals thus obtained, the touch panel controller obtains detection data according to a fluctuation in capacitive coupling state at each crossing part. The subprocessor (SMPU) 5, which is a microprocessor for subsystem use controls the activation of the touch panel. The subprocessor 5 performs a digital filtering operation on the detection data obtained by the touch panel controller 3, and then calculates, based on the resultant detection data with noise removed therefrom by the filtering operation, the position coordinates of the crossing part with a capacitance change arising. In short, in order to show the position of the crossing part where the stray capacitance has been changed, namely the position of the crossing part which a finger has been brought close to, the subprocessor 5 calculates position coordinates when the event of the touch is taking place.

The touch panel 1 includes a translucent (optically transmissive) electrode or dielectric film, and is place on e.g. the display plane of the display panel 2. The host processor (HMPU) 6 creates display data. The display controller 4 receives the display data from the host processor 6, and performs a display control for displaying the display data on the display panel 2. The host processor 6 takes the data of position coordinates from the subprocessor 5 when the event of the touch is taking place, and analyzes inputs resulting from an operation on the touch panel 1 based on the relation between display controller position coordinate data and a frame of display image given to and displayed by the display controller 4.

Although no special restriction is intended, e.g. a portable terminal device is formed by connecting, to the host processor 6, a communication control unit, an image-processing unit, an audio-processing unit, and other units including an accelerator, which are not shown in the drawing.

Figure 2:
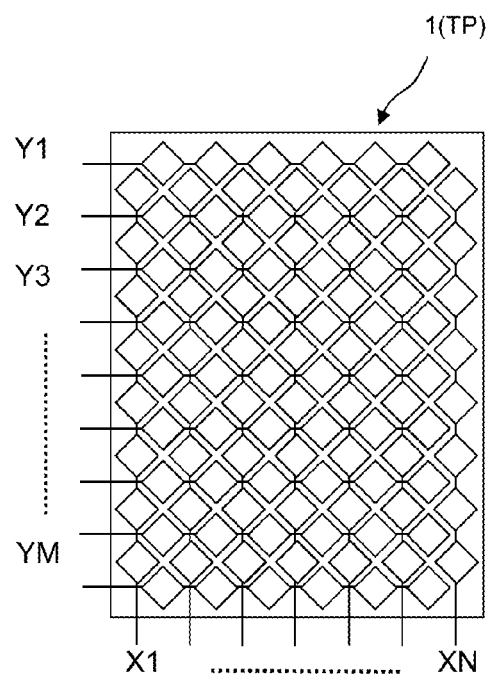
FIG. 2 is an explanatory diagram exemplifying the electrode structure of a touch panel.

FIG. 2 exemplifies the electrode structure of the touch panel 1. The touch panel 1 includes a number of drive electrodes (Y-electrodes) Y1 to YM formed in a horizontal direction, and a number of detection electrodes (X-electrodes) X1 to XN formed in a vertical direction, which are electrically insulated from each other. Each electrode has portions which are arranged along its extending direction, and each shaped into a square, thereby making a capacitive electrode. At each of the crossing parts of the X-electrodes and the Y-electrodes, an intersecting-point capacitance is formed by the capacitive electrodes of the electrodes involved therewith. When an object such as a finger is brought close to the intersecting-point capacitance, the object serves as a capacitive electrode, whereby a stray capacitance is formed and added to the intersecting-point capacitance. The Y-electrodes Y1 to YM are activated when supplied with a drive pulse from the touch panel controller 3 e.g. in the order of the electrodes arranged.

Figure 3:
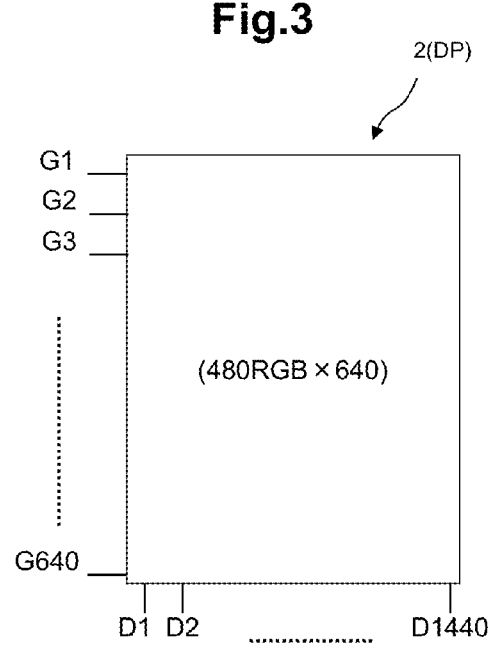
FIG. 3 is an explanatory diagram exemplifying the electrode structure of a display panel.

FIG. 3 exemplifies the electrode structure of the display panel 2. The display size of the display panel 2 shown in the drawing is as large as e.g. 480 RGB×640 in scale. The display panel 2 has: gate electrodes G1 to G640 extending in the horizontal direction, which are formed to serve as scan electrodes; and drain electrodes D1 to D1440 extending in the vertical direction, which are formed to serve as signal electrodes. At intersecting-point portions thereof, a number of display cells are disposed; the display cells each have a select terminal connected to the corresponding scan electrode, and an input terminal connected to the corresponding signal electrode. The gate electrodes G1 to G640 are activated when supplied with a scan pulse from the display controller 4 e.g. in the order of the electrodes arranged.

Figure 4:
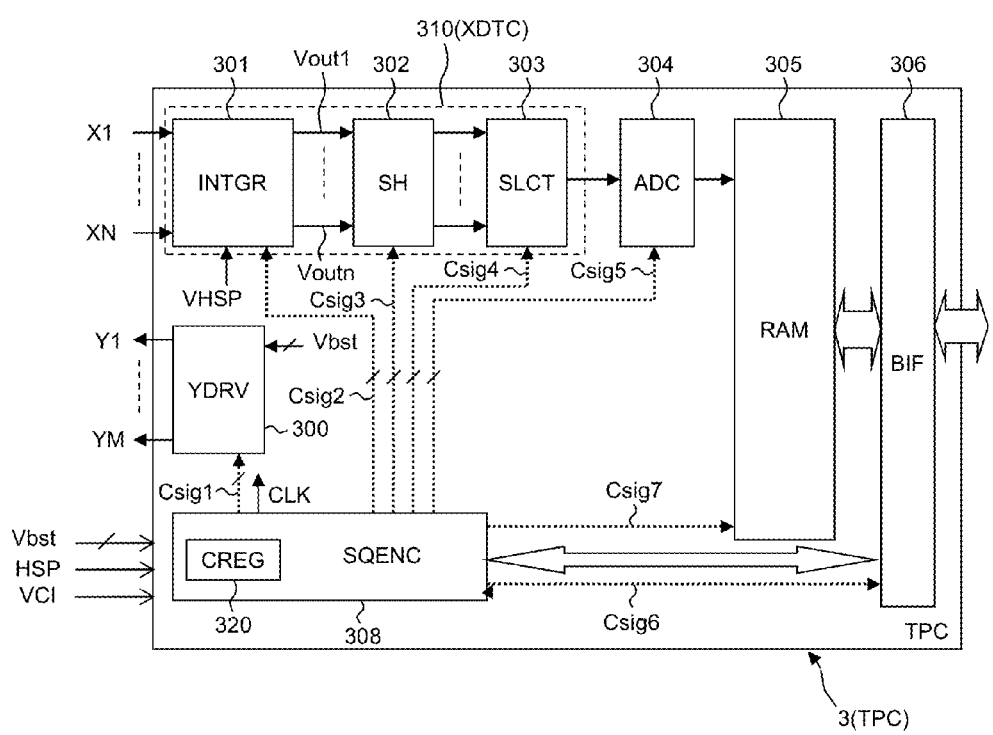
FIG. 4 is a block diagram exemplifying the whole structure of a touch panel controller 3.

FIG. 4 exemplifies the whole structure of the touch panel controller 3. The touch panel controller 3 has: a drive circuit (YDRV) 300; a detection circuit (XDTC) 310; an AD conversion circuit (ADC) 304; a RAM 305; a bus-interface circuit (BIF) 306; and a sequence-control circuit (SQENC) 308 as a control circuit. The detection circuit 310 includes e.g. an integration circuit (INTGR) 301, a sample-and-hold circuit (SH) 302, and a selector (SLCT) 303. Now, it is noted that a calibration circuit for the detection circuit 310 is not shown in the drawing.

To detect a touch, the drive circuit 300 repeats the action of sequentially outputting a drive pulse to the Y-electrodes Y1 to YM with a predetermined timing, provided that the drive pulse is output for each Y-electrode more than once. During this action, the signals are transmitted to the X-electrodes X1 to XN through capacitance components of the crossing parts and the vicinities thereof in the period of the pulse width of the drive pulse. To reduce noise components of the detection signals, the drive circuit 300 is arranged to have two or more kinds of outputtable pulse widths for each kind of the pulse signal period of the outputtable drive pulse. The detail of the structure of the drive circuit 300, the pulse width of the drive pulse and others are to be described later.

The integration circuit 301 integrates detection signals supplied to the X-electrodes X1 to XN, which are signal electrodes in synchronization with the drive pulse and outputs the integrated signals. The output detection signals are held by the sample-and-hold circuit 302 for each detection electrode. The selector 303 makes selection from the detection signals so held, and the selected detection signals are converted into detection data in the AD conversion circuit 304. The resultant detection data are accumulated in RAM 305. The detection data accumulated in RAM 305 are supplied to the subprocessor 5 through the bus-interface circuit 306, and then used in a digital filtering operation and a coordinate operation.

The sequence-control circuit 308 controls the actions of the drive circuit 300, the integration circuit 301, the sample-and-hold circuit 302, the selector 303, the AD conversion circuit 304 and the bus-interface circuit 306 in operation by use of control signals Csig1 to Csig6, and also controls the access to RAM 305 by use of a control signal Csig7. Although no special restriction is intended, the pulse voltage Vbst of a drive pulse that the drive circuit 300 outputs to the Y-electrodes, the initialization voltage VHSP of the X-electrodes that the integration circuit 301 inputs and in addition, a source voltage VIC are supplied from outside the touch panel controller 3.

Figure 5:
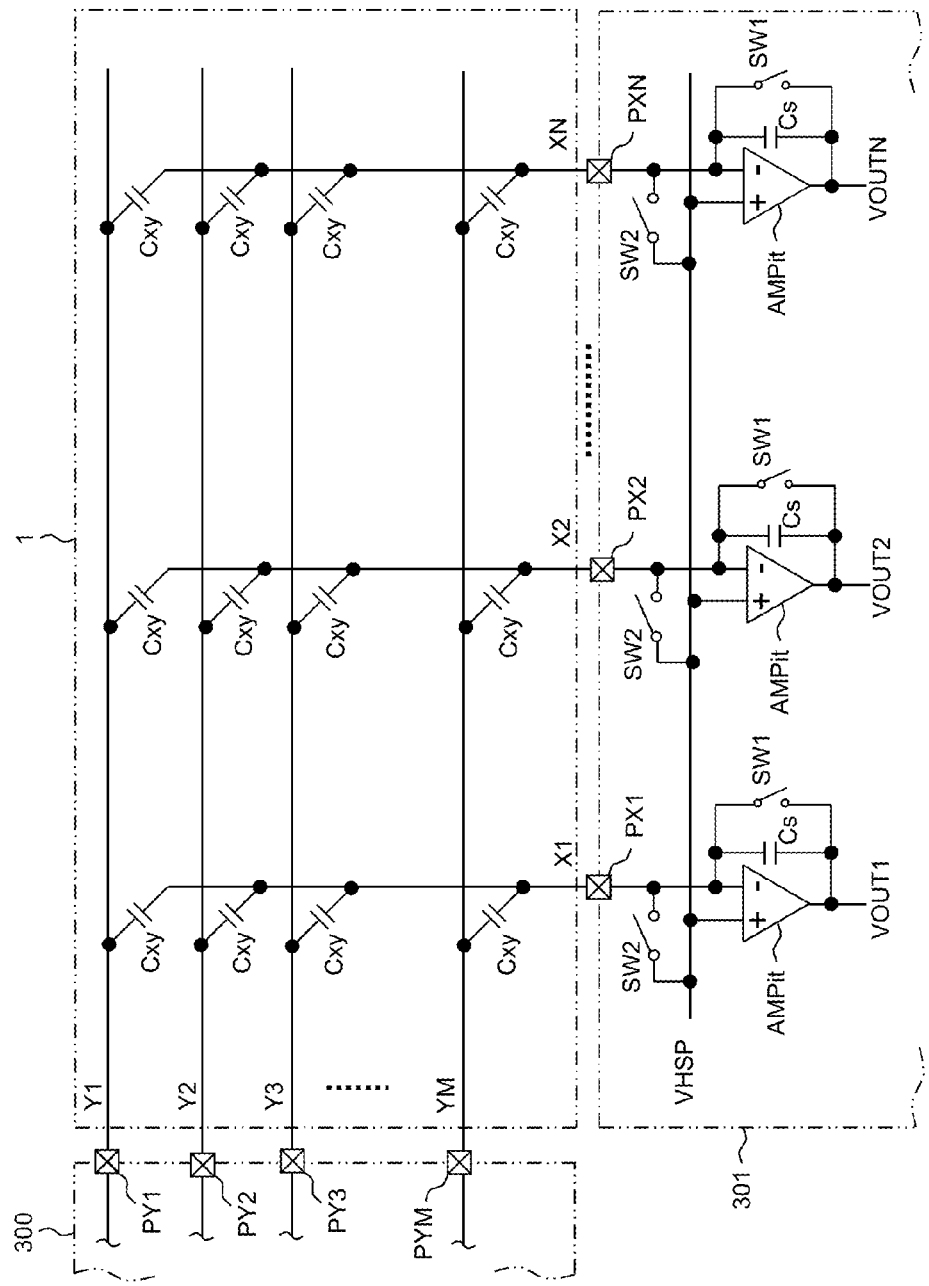
FIG. 5 is a circuit diagram showing an example of the equivalent circuit of the touch panel and an example of an integration circuit.

FIG. 5 exemplifies the equivalent circuit of the touch panel 1 and the integration circuit 301. In the touch panel 1, the Y-electrodes Y1 to YM and the X-electrodes X1 to XN are arranged in a matrix form, and the crossing parts thereof each form an intersecting-point capacitance (mutual capacitance) Cxy.

The integration circuit 301 includes: a precharge voltage VHSP for charging the X-electrodes X1 to XN; switches SW2 for controlling the application of the precharge voltage VHSP to the X-electrodes X1 to XN; operational amplifiers AMPit; integrating capacitors Cs; and switches SW1 for resetting the integrating capacitors Cs. Now, it is noted that each switch SW1 is one operable to reset an electric charge accumulated in the capacitor Cs to be used for detection. The drive terminals PY1 to PYM are drive terminals of the drive circuit 300 connected with the drive electrodes Y1 to YM. The detection terminals PX1 to PXN are detection terminals of the integration circuit 301 connected with the detection electrodes X1 to XN.

Figure 6:
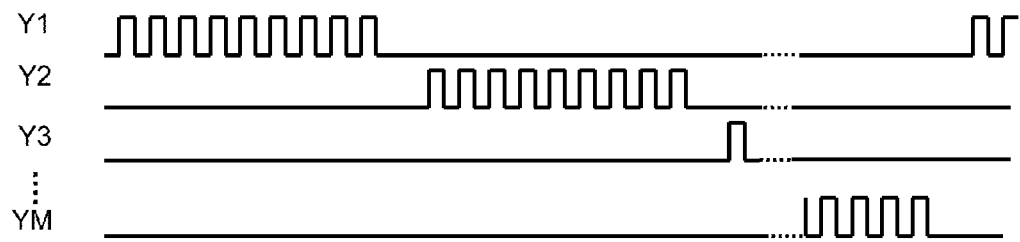
FIG. 6 is a waveform diagram showing examples of the signal waveforms of drive pulse signals supplied to Y-electrodes Y1 to YM.

FIG. 6 exemplifies signal waveforms of drive pulse signals supplied to the Y-electrodes Y1 to YM. For instance, the Y-electrodes Y1 to YM are supplied with drive pulses in the order of the electrodes arranged. In the embodiment shown by the drawing, for the sake of convenience, e.g. a group of drive pulses is supplied to each Y-electrode with a predetermined pulse period.

Figure 7:
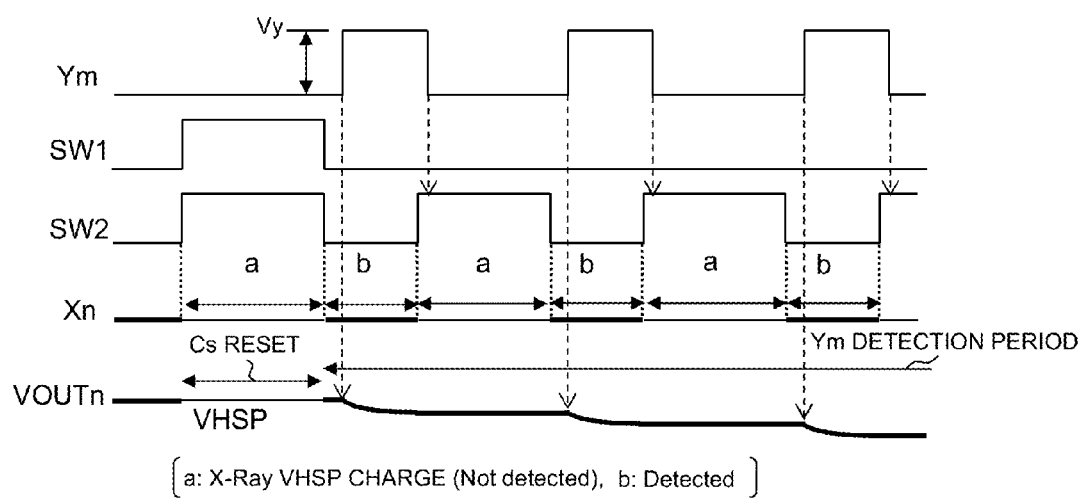
FIG. 7 is a timing diagram exemplifying the timing of a detecting action of the integration circuit in synchronization with the change of drive pulses supplied to the Y-electrodes Y1 to YM.

FIG. 7 exemplifies the timing of a detecting action of the integration circuit 301 in synchronization with a change in a drive pulse supplied to each Y-electrode Y1 to YM. First, the switches SW2 are turned ON to force the integration circuit to transition to a non-detection state "a" in which the precharge voltage VHSP is applied to the X-electrode Xn(n=1 to N), and the switches SW1 are turned ON (corresponding to the high-level period of the switches SW1) to reset the capacitors Cs. Second, the switches SW1 and SW2 are turned OFF (corresponding to the low-level period of the switches SW1 and SW2), whereby the integration circuit is forced to transition to a detection-waiting state "b". After the transition to the detection-waiting state "b", the X-electrodes Xn remain disconnected with the precharge voltage VHSP, and the voltage level of an inverting-input terminal "−" of the integration circuit 301 arranged to be earthed virtually is kept as it is. After the transition to the detection-waiting state "b", a rising pulse with an amplitude Vy is input as the drive pulse to the Y-electrode Y1, first (the remaining Y-electrodes Y2 to YM remain fixed at the low level). As a result, an electric charge (=Vy×Cxy) is moved to the X-electrode Xn through the intersecting-point capacitance Cxy on the Y-electrode Y1, and thus the output voltage VOUTn of the operational amplifier AMPit which receives the charge at its inverting-input terminal "−" is lowered by a voltage corresponding to the moved electric charge. Incidentally, if a finger is located in the vicinity of the crossing part concerned, the capacitance value of the intersecting-point capacitance Cxy is reduced by the stray capacitance produced by the finger. For instance, if the capacitance value of the intersecting-point capacitance Cxy has been reduced by a capacitance value Cf on one crossing part associated with the X-electrode X2, the electric charge to be input to the operational amplifier AMPit of the X-electrode X2 is Vy×(Cxy−Cf), and a drop of the level of the output VOUT2 of the operational amplifier AMPit becomes smaller than that in the case where no finger stays in the vicinity of the crossing part concerned. The output voltage VOUTn(n=1 to N) is converted into digital value detection data by the AD conversion circuit 304, which is to be used for a coordinate operation by the subprocessor 5 and other use.

Figure 8:
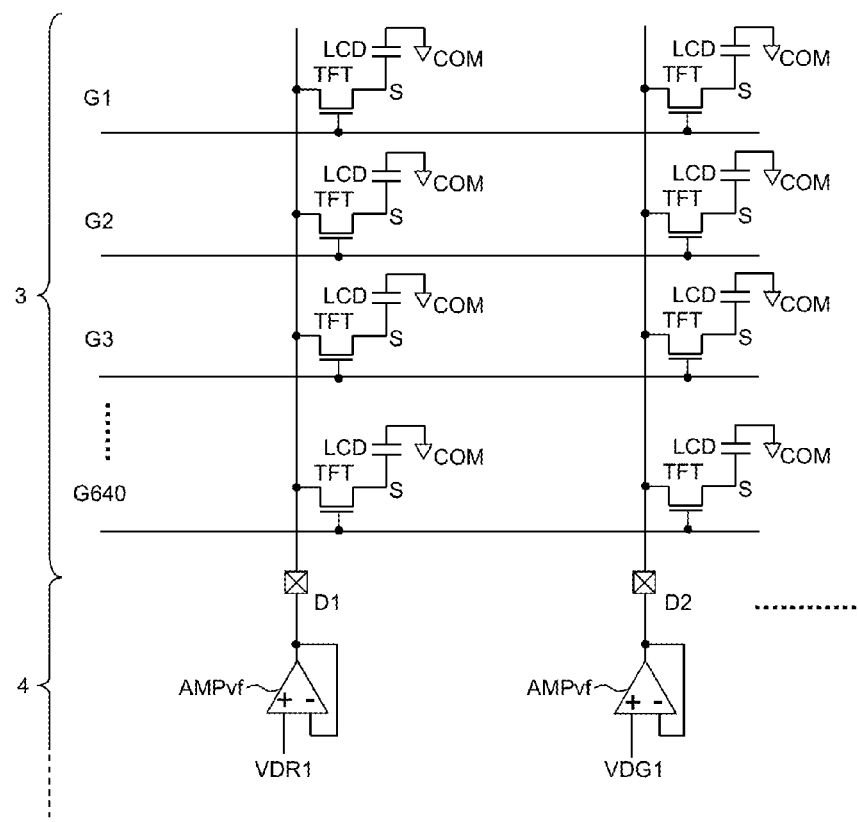
FIG. 8 is a circuit diagram exemplifying an equivalent circuit of a display panel.

FIG. 8 exemplifies the equivalent circuit of the display panel 2. The display panel 2 has gate electrodes G1 to G640 and drain electrodes D1 to D1440 arranged in a matrix form, and TFT (Thin Film Transistor) switches formed at intersections of the gate and drain electrodes. The TFT switches each have a source connected with a liquid crystal pixel electrode S of a liquid crystal capacitance LCD forming a sub-pixel; electrodes of the liquid crystal capacitances LCD on the opposite side to the TFT switches form a common electrode (COM). To the drain electrodes D1 to D1440, outputs of voltage followers constituted by operational amplifiers AMPvf of the display controller 4 are coupled. The voltage followers each output a signal voltage. For instance, the operational amplifier AMPvf of the drain electrode D1 is supplied with a gradation voltage VDR1 corresponding to red color, and the operational amplifier AMPvf of the drain electrode D2 is supplied with a gradation voltage VDG1 corresponding to green color.

Figure 9:
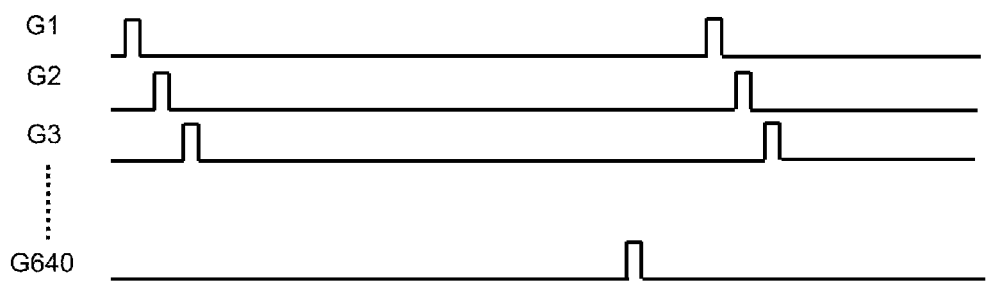
FIG. 9 is a waveform diagram exemplifying the signal waveform of a scan pulse supplied to gate electrodes G1 to G640.

FIG. 9 exemplifies signal waveforms of the scan pulses supplied to the gate electrodes G1 to G640. The gate electrodes G1 to G640 are supplied with a scan pulse in the order of the electrodes arranged, for example.

Figure 10:
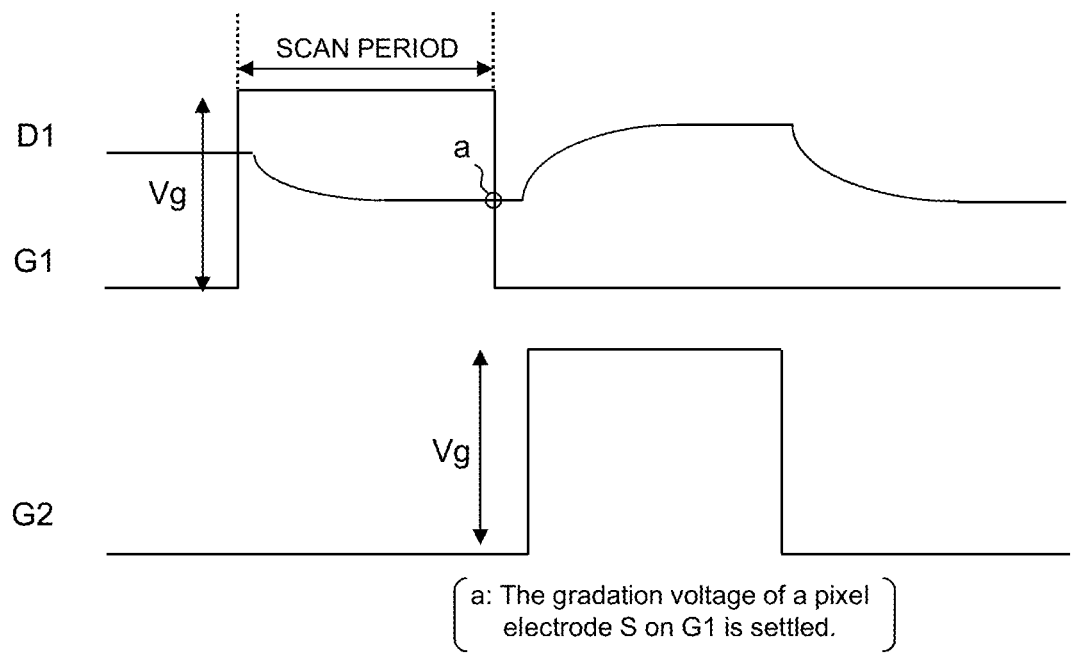
FIG. 10 is a waveform diagram exemplifying timing waveforms of a scan pulse applied to a gate electrode, and a gradation voltage (signal voltage) applied to a drain electrode.

FIG. 10 exemplifies timing waveforms of a scan pulse applied to one gate electrode and a gradation voltage (signal voltage) applied to one drain electrode. For instance, a scan pulse having an amplitude Vg is input to the gate electrode G1 to turn ON the TFT switches arranged on the gate electrode G1. Then, a gradation voltage VDR1 is applied to the liquid crystal pixel electrode S selected through the TFT switch from the drain electrode D1. The input voltage to the liquid crystal pixel electrode S is settled at the time when the scan pulse falls. Because of a reference voltage applied to the common electrode COM, during the time of one frame after the TFT switch is turned OFF, the reference voltage COM and the gradation voltage VDR1 are held by the liquid crystal capacitance LCD, whereby the display brightness is defined.

FIG. 11A exemplifies waveforms of the scan pulse and the gradation voltage (signal voltage) supplied to the display panel 2, and a waveform of the drive pulse supplied to the touch panel 1.

The control of the touch panel 1 is arranged turning to the timing of voltage change of the gate electrode (G1) and drain electrode (D1) of the display panel 2; the X-electrode (Xn) is controlled to transition in a non-detection period (charging period of the voltage VHSP) with the timing of voltage change of the gate and drain electrodes. Turning to the timing of voltage change of the Y-electrode (Y1) of the touch panel 1, the control of the display panel 2 is arranged so that the timing of the fall of the drive pulse of the Y-electrode (Y1) is set to be, by a fixed period (t3), prior to the timing of the fall of the scan pulse when the gradation voltage is decided.

With the timing relation like this, the high-level period of the drive pulse waveform of the Y-electrodes Y1 to YM is set within the high-level period of the gate electrodes G1 to G640, and the high-level width of the drive pulse waveform of the Y-electrodes Y1 to YM is made smaller than that of the scan pulse waveform of the gate electrodes G1 to G640. According to this, turning to the timing of voltage change of the scan electrodes G1 to G640 of the display panel 2, the control by the touch panel controller 3 is arranged so that the Y-electrodes Y1 to YM go into the non-pulse drive period, namely the non-detection period for the X-electrodes X1 to XN (the period of charging the X-electrodes with the voltage VHSP) with the timing of the voltage change. Therefore, noise produced by a voltage change of the scan electrodes G1 to G640 has no influence on the detecting action by the X-electrodes X1 to XN, which is executed in the pulse drive period of the Y-electrodes Y1 to YM. Further, turning to the timing of voltage change of the Y-electrodes Y1 to YM of the touch panel, the control by the display controller 4 is arranged so that the fall timing of the drive pulse of the Y-electrodes Y1 to YM disagrees with the fall timing (denoted by Ta in FIG. 11A) of the scan pulse of the scan electrode (G1, G2) with which the signal voltage to be supplied to a display cell is settled. Hence, the noise resulting from the change in voltage of the Y-electrodes Y1 to YM has no influence on signal voltages settled by the display cell. In summary, it is possible to avoid the worsening of the accuracy of touch detection by the touch panel controller 3, and the deterioration of the display performance by the display controller 4.

In embodiment in connection with the FIG. 11A, the drive pulse is applied to the Y-electrodes once for a one-scan period during which the liquid crystal display 2 is scanned once. In this case, the high-level period of the drive pulse of the Y-electrodes is set to be included in the high-level period of the scan pulse of the gate electrodes. The timing of the drive pulse of the Y-electrodes in the case can be easily defined by an internal reference clock (of e.g. 4 MHz), a signal which defines the one-scan period (a horizontal synchronizing signal, e.g. Hsync), and parameters t1, t2 and t3 exemplified in FIG. 11A. The sequence-control circuit 308 of the touch panel controller 3 can control the pulse drive timing of the Y-electrode as exemplified by FIG. 11A when receiving the reference clock (of e.g. 4 MHz), a horizontal synchronizing signal such as Hsync, and parameters t1, t2 and t3. The parameters t1, t2 and t3 may be initially set on the control register 320 by the subprocessor 5.

FIG. 11B exemplifies waveforms of the scan pulse and the gradation voltage (signal voltage) supplied to the display panel 2, and a waveform of the drive pulse supplied to the touch panel.

Now, turning to especially the high-level period of the gate electrode (G1) line of the display panel, the touch panel is controlled so that the X-electrode (Xn) transitions to its non-detection period (VHSP charging period) in line with the high-level period. Further, turning to especially the low-level period of the Y-electrode (Y1) of the touch sensor, in the display panel, the timing for applying the drive pulse is set in line with the low-level period of the Y-electrode. The timing of fall of the Y-electrode (Y1) is set to be, by a fixed period, prior to the timing of rise of the scan pulse when a gradation voltage (voltage signal) is decided.

In the case of FIG. 11B, the drive pulse is input to the Y-electrodes once for a one-scan period during which the display panel is scanned once. In such a case, the high-level period of the Y-electrode drive pulse and the high-level period of the scan pulse are set to be different from each other in timing. The timing of the Y-electrode drive pulse can be readily determined by an internal reference clock (of e.g. 4 MHz), a signal which defines the one-scan period (e.g. the rise of the scan pulse), and parameters t1 and t2. In the case of FIG. 11B, the drive pulse may have a controllable pulse width, and the gate electrode scan pulse and the Y-electrode drive pulse may be output in synchronization with each other, and each pulse is applied to the corresponding electrode as in the case of FIG. 11A.

<<AC Charger Noise>>

Next, the AC charger noise will be described. The example of taking a counter measure against the AC charger noise in addition to a countermeasure against noise arranged so that the high-level period of the drive pulse is included in the high-level period of the scan pulse is taken here.

Figure 12:
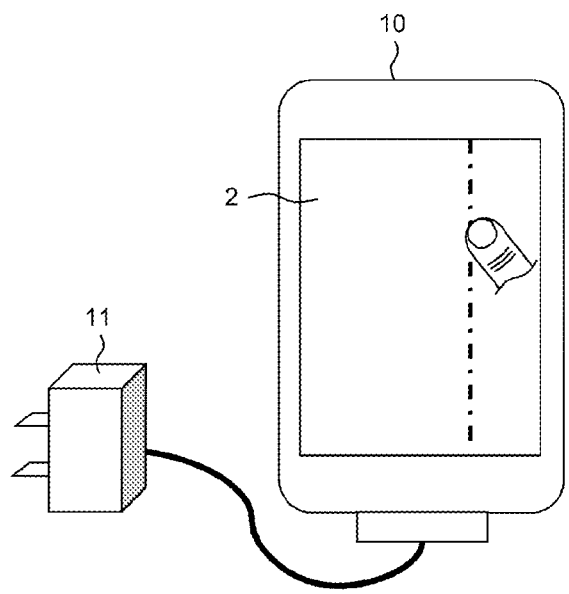
FIG. 12 is an explanatory diagram showing a situation in use for explaining that the ability of detection worsens in case that a touch-detection cycle is executed during the action of charging a portable terminal device with an AC charger.

The AC charger noise is a phenomenon such that noise comes to the surface depending on the frequency of a drive pulse signal of the touch panel. Specifically, the ability of detection is worsened by the execution of a touch-detection cycle in the middle of the action of charging, by use of an AC charger (AC adapter) 11, a portable terminal device 10, such as PDA with a touch panel 1 incorporated therein. That is, if a portable terminal device 10 such as PDA equipped with a touch panel 1 is operated by a user (the owner of the portable terminal device or a person using it) in a situation such that a secondary battery of the portable terminal device 10 is being charged with an AC charger 11 connected thereto as exemplified by FIG. 12, the ability of touch detection is worsened. The worsening refers to the following fact concretely. That is, the touch coordinates of an area located in the same detection electrode direction as a direction along which a touched area is arranged (the same detection line shown by the chain line in the drawing) are derived without any touch.

Figure 13:
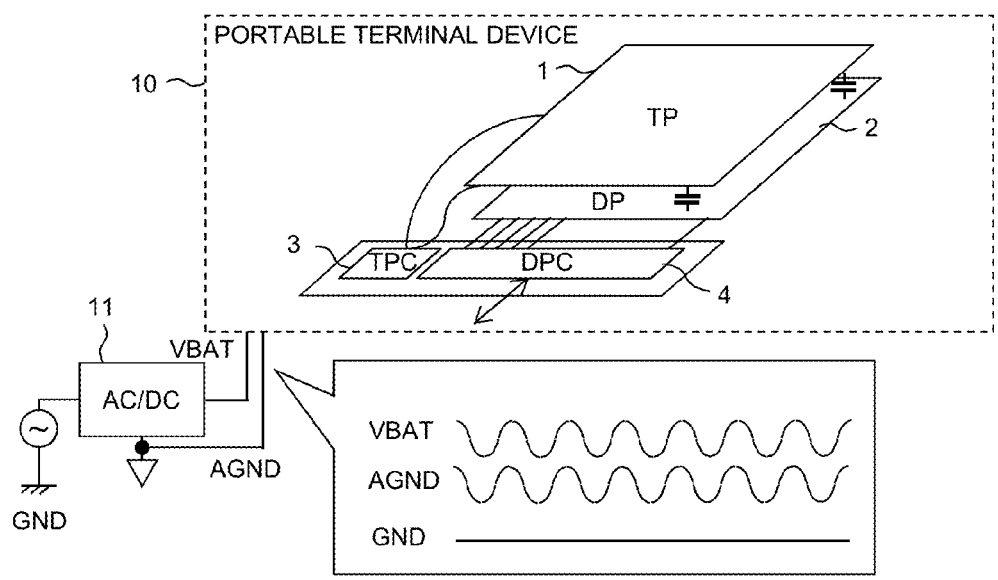
FIG. 13 is an explanatory diagram schematically showing the state of a power source of a portable terminal device in the course of charging.

FIG. 13 schematically shows the condition of the power source of the portable terminal device in the middle of charging. The AC charger 11, namely AC-DC converter is a device operable to convert e.g. an AC100V commercial power source into a DC voltage VBAT of the secondary battery of the portable terminal device 10. In the drawing, GND denotes the ground to the earth (referred to as "global ground"), and AGND denotes the ground of the portable terminal device (referred to as "terminal ground" or "local ground"). As to the portable terminal device 10, it is assumed that the ground to the earth, GND is separated from the terminal ground AGND. There have been many AC chargers 11 such that the output voltage VBAT vibrates together with the AC charger local ground voltage, namely the terminal ground voltage AGND at a predetermined frequency. For instance, the power source (i.e. terminal-side power source) VBAT on the side of the portable terminal device 10 appears to fluctuate with respect to the ground to the earth. The fluctuation width thereof varies according to the types of the AC chargers 11 or charging status. For instance, it appears to fluctuate at a frequency of 1 to 500 kHz approximately. It has been known that the fluctuation frequency of the terminal-side power source VBAT largely depends on the operation frequency of the AC/DC regulating circuit of the AC charger, and the operation frequency of the regulating circuit fluctuates according to the remaining amount of a built-in secondary battery of the terminal.

Figure 14:
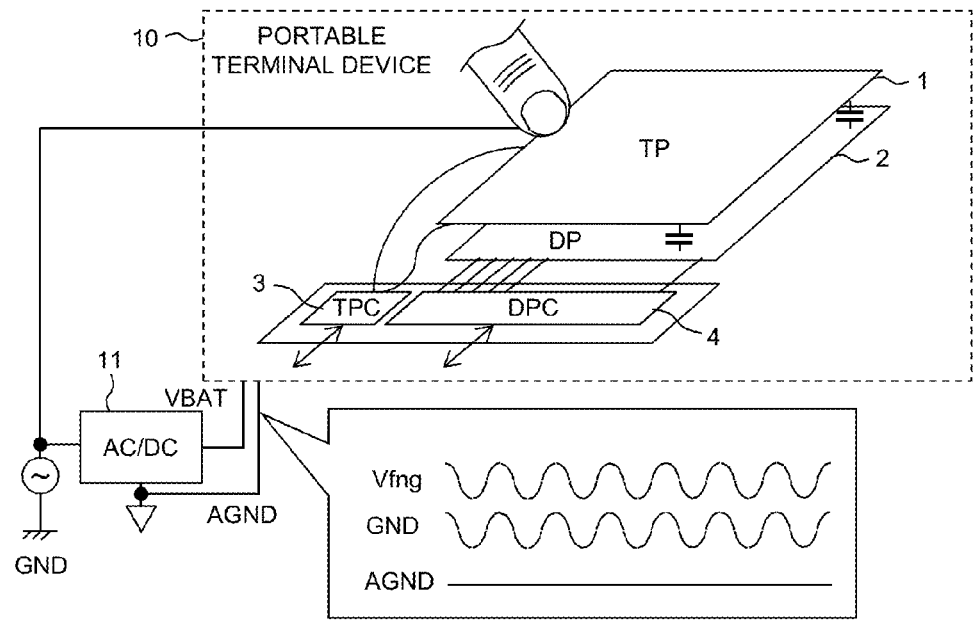
FIG. 14 is an explanatory diagram showing the relation between a ground GND to the earth and the surface potential Vfng of a touched area with reference to a terminal ground AGND.

FIG. 14 shows the relation between the ground GND to the earth and the surface potential Vfng of a touched area with respect to the terminal ground AGND. When viewed with reference to the terminal ground AGND, the surface potential Vfng appears to fluctuate at a frequency of 1 to 500 kHz approximately.

Figure 15:
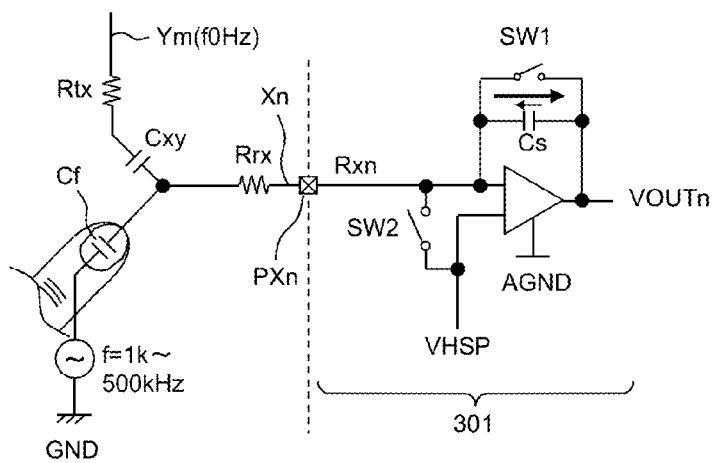
FIG. 15 is an equivalent circuit diagram exemplifying the electrical connection of one crossing part focusing on a touched area and the integration circuit.

FIG. 15 exemplifies an electrical connection of one crossing part focusing on a touched area and the integration circuit 301 of the detection circuit 310, wherein Rtx represents a resistance load of the Y-electrode ym of the touch panel 1, Rrx represents a resistance load of the X-electrode Xn of the touch panel 1, and Cxy represents a mutual capacitance of the touch panel 1. The portion on the right side of the broken line in the drawing shows an example of the detection circuit having the integration circuit 301. In the detection circuit with the X-electrode Xn connected thereto, a detecting action is realized by controlling a group of switches SW1 and SW2. In the actual detecting action, a rectangular pulse having a frequency f0 is input to the Y-electrode Ym, and the switches SW1 and SW2 are controlled in line with the rectangular pulse. On the other hand, the surface potential Vfng is applied to e.g. the X-electrode Xn through a capacitance Cf. This is noise (AC charger noise) of about 1 to 500 kHz resulting from the connection of the AC charger 11, which is input to the integration circuit 301 through the X-electrode Xn. The surface potential Vfng is also referred to as "AC charger noise below.

Figure 16:
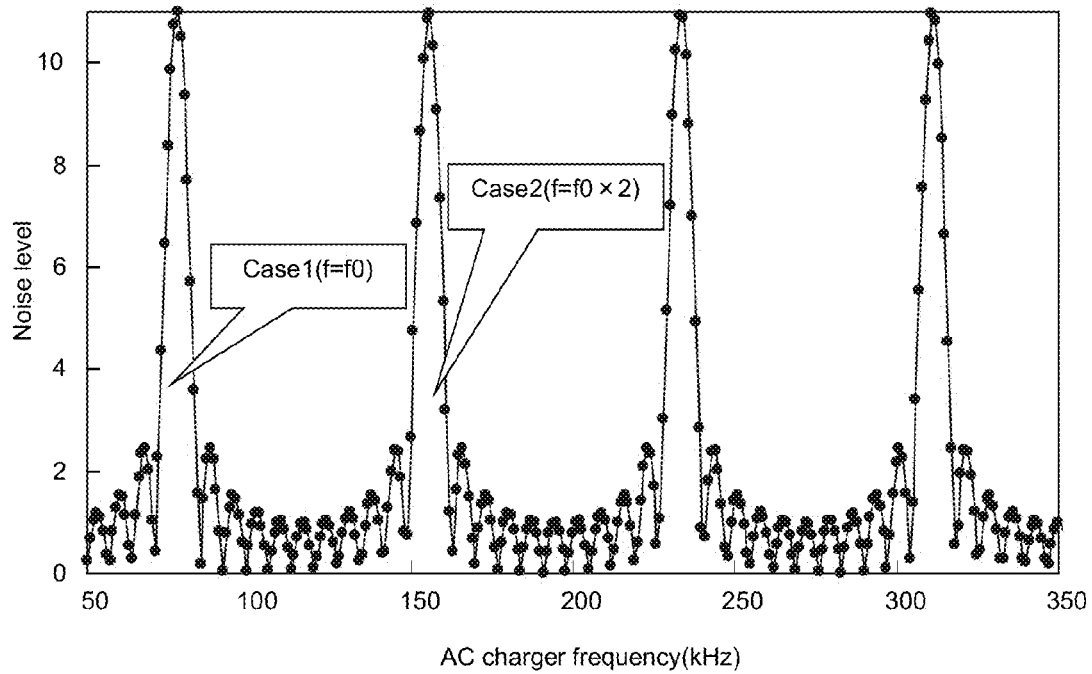
FIG. 16 is an explanatory diagram exemplifying the relation between the frequency of the AC charger noise Vfng and a noise level output by a detection circuit.

FIG. 16 exemplifies the relation between the frequency of the AC charger noise Vfng and a noise level output by the detection circuit. The noise level has dependence on the frequency. It is clear that the noise level rises when the frequency f of AC charger noise Vfng coincides with the frequency f0 of the drive pulse applied to the Y-electrode Ym, and further coincides with n-fold (n is a positive integer) the frequency f0. Case1 shows a case where the frequency f of AC charger noise Vfng is equal to the frequency f0 of the drive pulse. Case2 shows a case where the frequency f of AC charger noise Vfng is twice the frequency f0 of the drive pulse.

Figure 17:
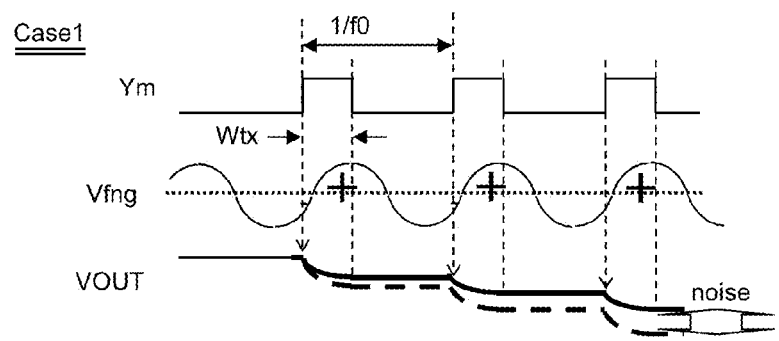
FIG. 17 is an explanatory diagram showing a mechanism in the case Case1 shown in FIG. 16, namely the case where the frequency f of AC charger noise Vfng is f0 with the noise level rising.

FIG. 17 shows the mechanism of the rise in the noise level in the case Case1 of FIG. 16, namely in the case where the frequency f of AC charger noise Vfng is equal to the frequency f0. The pulse width Wtx of the drive pulse may be considered as a detection period, and during the detection period, the AC charger noise Vfng is built up. In the drawing, a part of the AC charger noise Vfng above the dotted line represents a plus component of the AC charger noise Vfng, and a part below the dotted line represents a minus component of the AC charger noise Vfng. The AC charger noise is built up each time the drive pulse is applied and therefore, a result of the buildup is observed as noise at an output VOUT of the integration circuit 301.

Figure 18:
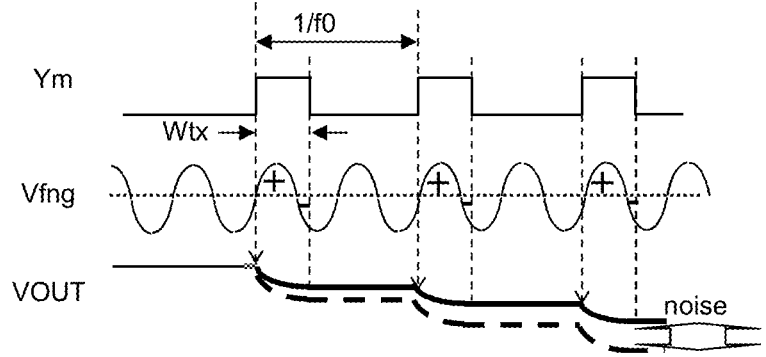
FIG. 18 is an explanatory diagram showing a mechanism in the case Case2 shown in FIG. 17, namely the case where the frequency f of AC charger noise Vfng is f0×2 with the noise level rising.

FIG. 18 shows the mechanism of the rise in the noise level in the case Case2 of FIG. 16, namely in the case where the frequency f of AC charger noise Vfng is equal to f0×2. Also in this case, the AC charger noise Vfng is built up during the detection period. In the drawing, a part of the AC charger noise Vfng above the dotted line represents a plus component of the AC charger noise Vfng, and a part below the dotted line represents a minus component of the AC charger noise Vfng. The AC charger noise Vfng is built up each time the drive pulse is applied and therefore, a result of the buildup is observed as noise at the output VOUT of the integration circuit 301. Incidentally, in case that the frequency f of AC charger noise Vfng coincides with none of the drive pulse frequencies f0 and f0×n, or does not substantially coincide with them, the influence of the AC charger noise Vfng disappears with the aid of the effect of evening out detections by plural times of drive pulse input.

As described above, the AC charger noise Vfng comes to the fore on condition that its frequency f coincides or substantially coincides with any of the drive pulse frequencies f0 and f0×n, and the pulse width of the drive pulse does not coincide with the period of the AC charger noise Vfng.

<<Basic Principle of Countermeasure Against AC Charger Noise>>

Next, the basic principle of the countermeasure against AC charger noise will be described.

Figure 19:
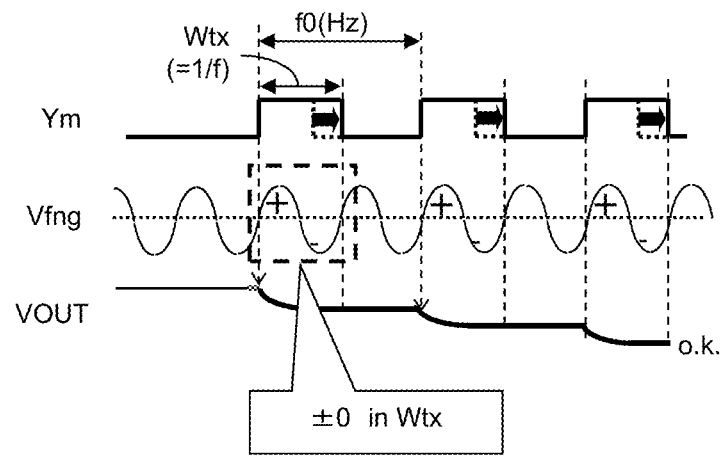
FIG. 19 is an explanatory diagram exemplifying a basic principle of a countermeasure against AC charger noise in the case Case2, namely the case where the frequency f of AC charger noise Vfng is f0×2.

Referring to FIG. 19, the basic principle of the countermeasure against AC charger noise in the case Case2, namely in a case where the frequency f of AC charger noise Vfng is equal to f0×2 is exemplified. In the case of FIG. 19, it is shown that the AC charger noise can be cancelled out by setting Wtx=1/(f0×2), where Wtx is the pulse width of the drive pulse. Specifically, the period of the pulse width Wtx represents a touch detection period, and plus components (+) and minus components (−) of the waveforms of AC charger noise Vfng become equal to each other within a frame defined by a broken line, and consequently the noise components are balanced out with each other on the whole and therefore, an output as expected can be obtained at the output VOUT of the integration circuit 301.

Figure 20:
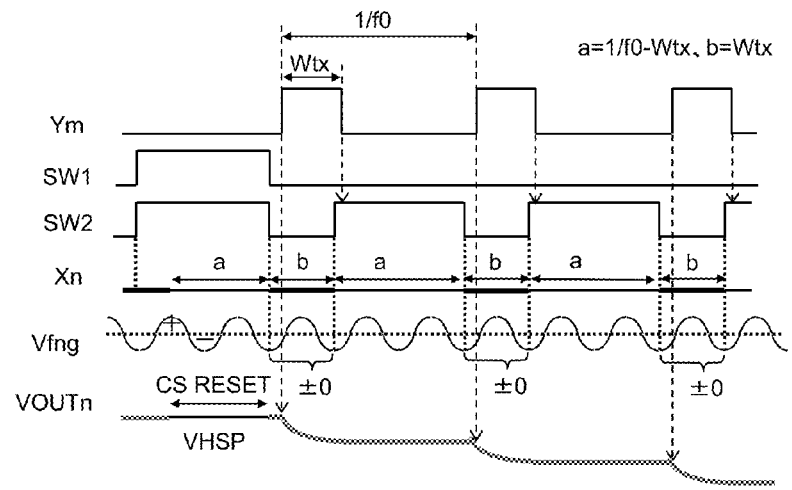
FIG. 20 is an explanatory diagram exemplifying the basic principle of the countermeasure against AC charger noise in the case where the frequency f of AC charger noise is f0×3.

Referring to FIG. 20, the basic principle of the countermeasure against AC charger noise in a case where the AC charger noise frequency f is equal to f0×3 is exemplified. In the case of FIG. 20, it is shown that the AC charger noise can be cancelled out by setting e.g. Wtx=1/(f0×3), where Wtx is the pulse width of the drive pulse. Incidentally, the actual detection period corresponds to a range denoted by "b" in the drawing, and the period of the range b is equal to the pulse width Wtx of the drive pulse. The difference between the actual period "b" and the pulse width Wtx in timing is a result of factoring in the delay of an action for the detection period in response to the change in the pulse width Wtx of the drive pulse.

As is clear from the examples of FIG. 19 and FIG. 20, even in a case where the frequency f of AC charger noise Vfng coincides or substantially coincides with any of the drive pulse frequencies f0 and f0×n, the AC charger noise is cancelled out on the whole as long as the pulse width of the drive pulse is a positive integer multiple of the period of the AC charger noise. The drive pulse frequency is already known one because of its system configuration, the frequency of the AC charger noise Vfng is changed according to the charging status. Especially, the scan pulse frequency depends on the relation with the display performance and therefore, in the case of taking a countermeasure against the noise factoring the relation with the scan pulse, the drive pulse frequency is fixed naturally. Taking into account the restriction like this, the drive circuit 300 operable to output a drive pulse to the drive electrode Ym of the touch panel 1 shall be arranged to have two or more kinds of outputtable pulse widths for each kind of pulse signal periods of the outputtable drive pulses. In short, the detecting action involved with the touch panel 1 can be performed with different drive pulse widths. Specifically, in the first embodiment, the drive circuit outputs drive pulses to each drive electrode Ym with two or more pulse widths mixed. In the second embodiment, the pulse width of the drive pulse to each drive electrode Ym is changed to output more than one kind of drive pulses. The detection data for each crossing part of the touch panel are created according to the pulse widths of the drive pulses, and one piece of detection data is selected for each crossing part as optimal data. In the second embodiment, the drive pulse to each drive electrode Ym is changed in pulse width to output more than one kind of drive pulses. On each crossing part of the touch panel, detection data are created for each pulse width of the drive pulses, and one piece of detection data is selected for each crossing part as optimal data. In the third embodiment, the optimal pulse width is decided by use of data detected in a spurious way by previously supplying more than one kind of pulses through the capacitance-connecting node connected to the input stage of the detection circuit 310. The decided pulse width is used to output the drive pulse to the drive electrode. The embodiments will be described concretely below.

<<Countermeasure Against AC Charger Noise in Connection with the First Embodiment>>

Figure 21:
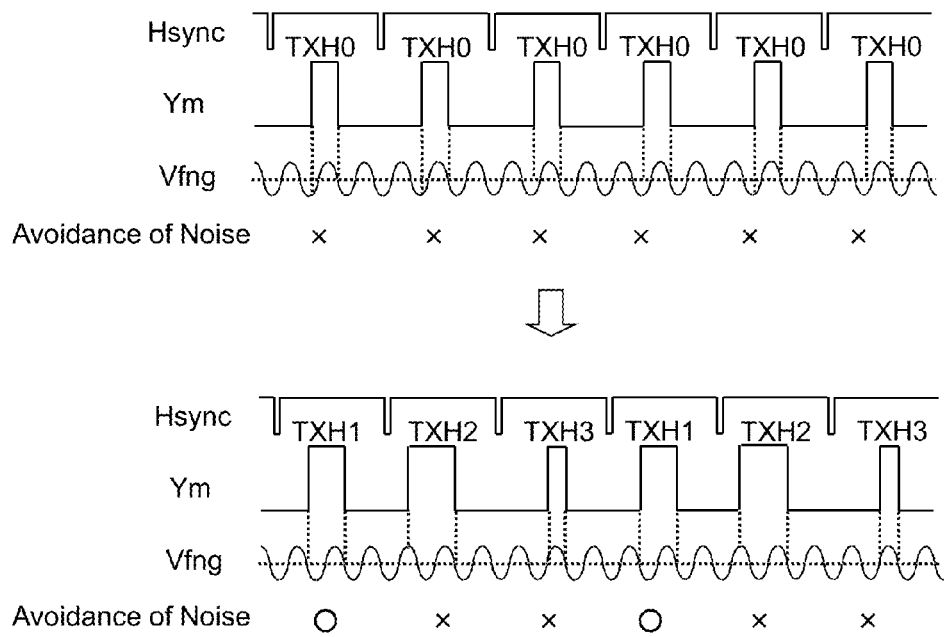
FIG. 21 is an explanatory diagram for a countermeasure against AC charger noise in connection with the first embodiment.

FIG. 21 is a diagram for explaining a countermeasure against AC charger noise in connection with the first embodiment. FIG. 21 is based on the assumption that a countermeasure for noise reduction according to cooperation with the display controller 4 is adopted in addition, showing a case where a detecting action in connection with the touch panel 1 is performed using, as the reference, the frequency of a scan pulse signal Hsync of the display panel 2 and the waveform thereof. According to this, when the frequency of the scan pulse signal Hsync is f0, the frequency of a drive pulse to be applied to the Y-electrode Ym is set to e.g. f0.

Now, if the pulse width Wtx of the drive pulse of the Y-electrode Ym is TXH0 ($\neq$1/(f0×3)) and the frequency of AC charger noise Vfng is e.g. f0×3, the buildup of AC charger noise in the signal is caused each detection, and thus noise is superimposed. This is because the pulse width TXH0 of the drive pulse does not coincide with the period of the AC charger noise Vfng in short.

In contrast, e.g. three pulse widths of TXH1 (=1/(f0×3)), TXH2 (=1/(f0×2)) and TXH3 (=1/(f0×5)) are prepared as the pulse width Wtx of the drive pulse of the Y-electrode Ym, and then the drive pulse is applied to the Y-electrode Ym with the three pulse widths mixed, which means that the three pulse widths are in the prime-number relation. In this case, the buildup of AC charger noise in the signal becomes ±0 consequently when the pulse width Wtx of the drive pulse of the Y-electrode Ym is TXH1 (=1/(f0×3)), resulting in the reduction in noise level to one-third. In short, since the pulse width TXH1 of the drive pulse coincides with the period of the AC charger noise Vfng, the noise level is reduced to one-third accordingly.

In a touch detection method for successively supplying a plurality of drive pulses to each drive electrode Ym in this way, one detecting action is performed with different pulse widths (corresponding to high-level periods there) mixed in the drive pulses. Therefore, even when the frequency f of AC charger noise Vfng coincides or substantially coincides with any of the drive pulse frequencies f0 and f0×n, it is possible to avoid that the drive pulse widths all do not coincide with the period of AC charger noise Vfng in one detecting action, and the influence of the AC charger noise Vfng is reduced with the aid of the effect of evening out detections by plural times of drive pulse input.

Especially, in the case of performing one detecting action with different pulse widths of drive pulses mixed, the high-level pulse widths of the drive pulses are selected from the group consisting of the reciprocals of prime number multiples of the drive pulse frequencies. Since the pulse widths are in the prime-number relation with each other, the occurrence of a situation that the cumulative buildup of an undesired voltage component cannot be mitigated can be prevented by use of any of such pulse widths.

While in the embodiment of FIG. 21, the number of the pulse width kinds is three, the invention is not limited thereto, and the number of pulse width kinds may be adequate one as long as it is more than one.

<<Countermeasure Against AC Charger Noise in Connection with the Second Embodiment>>

Figure 22:
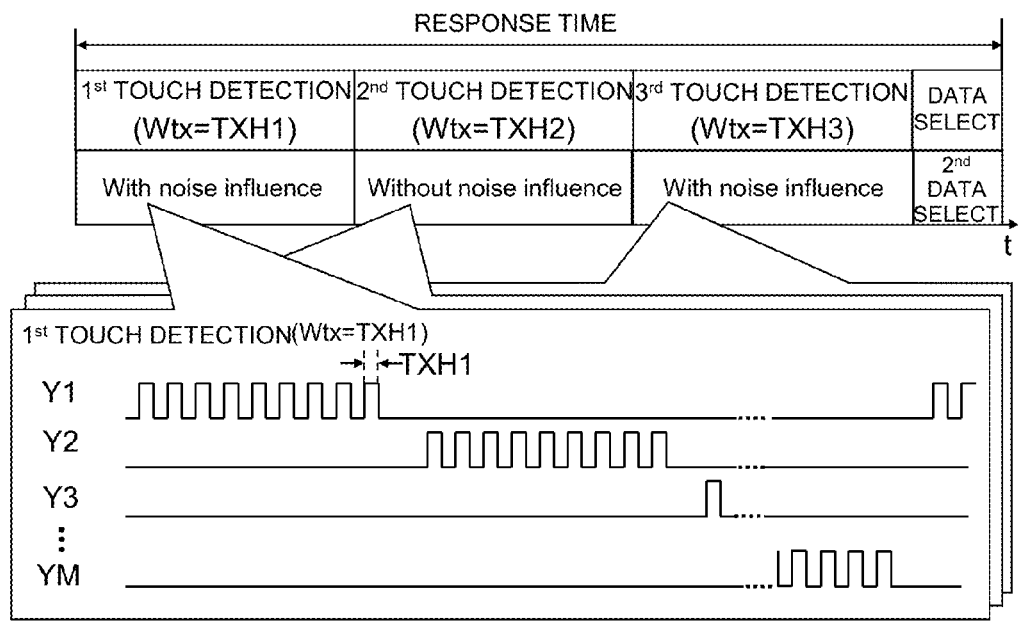
FIG. 22 is an explanatory diagram for a countermeasure against AC charger noise in connection with the second embodiment.

FIG. 22 is a diagram for explaining a countermeasure against AC charger noise in connection with the second embodiment. The countermeasure against AC charger noise is characterized as follows. Within a response time (i.e. time required for making a response to send back a set of position coordinates to the host), a touch detection is performed p times with drive pulses having different pulse widths Wtx (the pulse width of a drive pulse is also referred to as "drive pulse width" simply). The subprocessor 5 selects, from the resultant p pieces of data, a piece of data smaller in the influence of AC charger noise, calculates coordinates and the result to the host processor 6. While in the case of FIG. 22, p=3 is assumed, the invention is not so limited. The number of times the touch detection is performed may be adequate as long as it is more than one.

Figure 23:
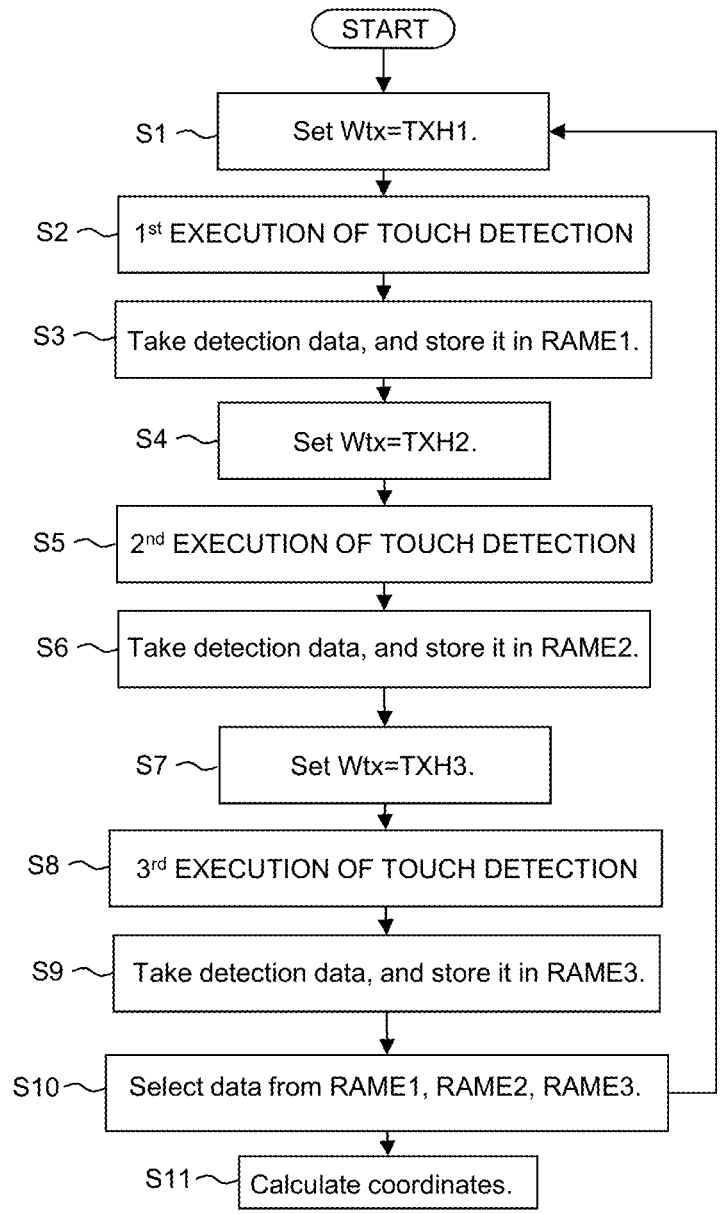
FIG. 23 is a flow chart of an detecting action in the case of realizing the countermeasure against AC charger noise in connection with the second embodiment, especially, in the case of setting p=3.

FIG. 23 exemplifies a detecting action flow chart in the case of realizing the countermeasure against AC charger noise in connection with the second embodiment, especially in the case of setting p=3. In the detecting action, the drive pulse width Wtx is switched among TXH1, TXH2, TXH3 to perform the touch detection (in Steps S1, S2, S4, S5, S7, and S8), and detection data detected by the detection circuit 310 for the respective pulse widths are stored in RAM 305, in which the detection data are classified by the pulse width. For instance, detection data when the pulse width Wtx is TXH1 is stored in a memory region RAME1 (S3); detection data when the pulse width Wtx is TXH2 is stored in a memory region RAME2 (S6); and detection data when the pulse width Wtx is TXH3 is stored in a memory region RAME3 (S9). The detecting action is repeated for the drive electrodes X1 to XM, for example.

During the detecting action, the subprocessor 5 reads detection data from the memory regions RAME1, RAME2, and RAME3 of RAM 305 to calculate touch coordinates with an appropriate timing. In the case of a one-point touch, if there is no influence of AC charger noise, the number of sets of touch coordinates derived for the one-point touch is one. In contrast, with the AC charger noise having the influence, more than one point of mistouch coordinates is created on the touched detection line as described with reference to FIG. 12. From the above, after the calculation of the coordinates, the result of detection by use of a pulse width which minimizes the number of touch coordinates is determined to be a result which minimizes the influence of AC charger noise, which is notified to the host processor 6 (S11).

Figure 24:
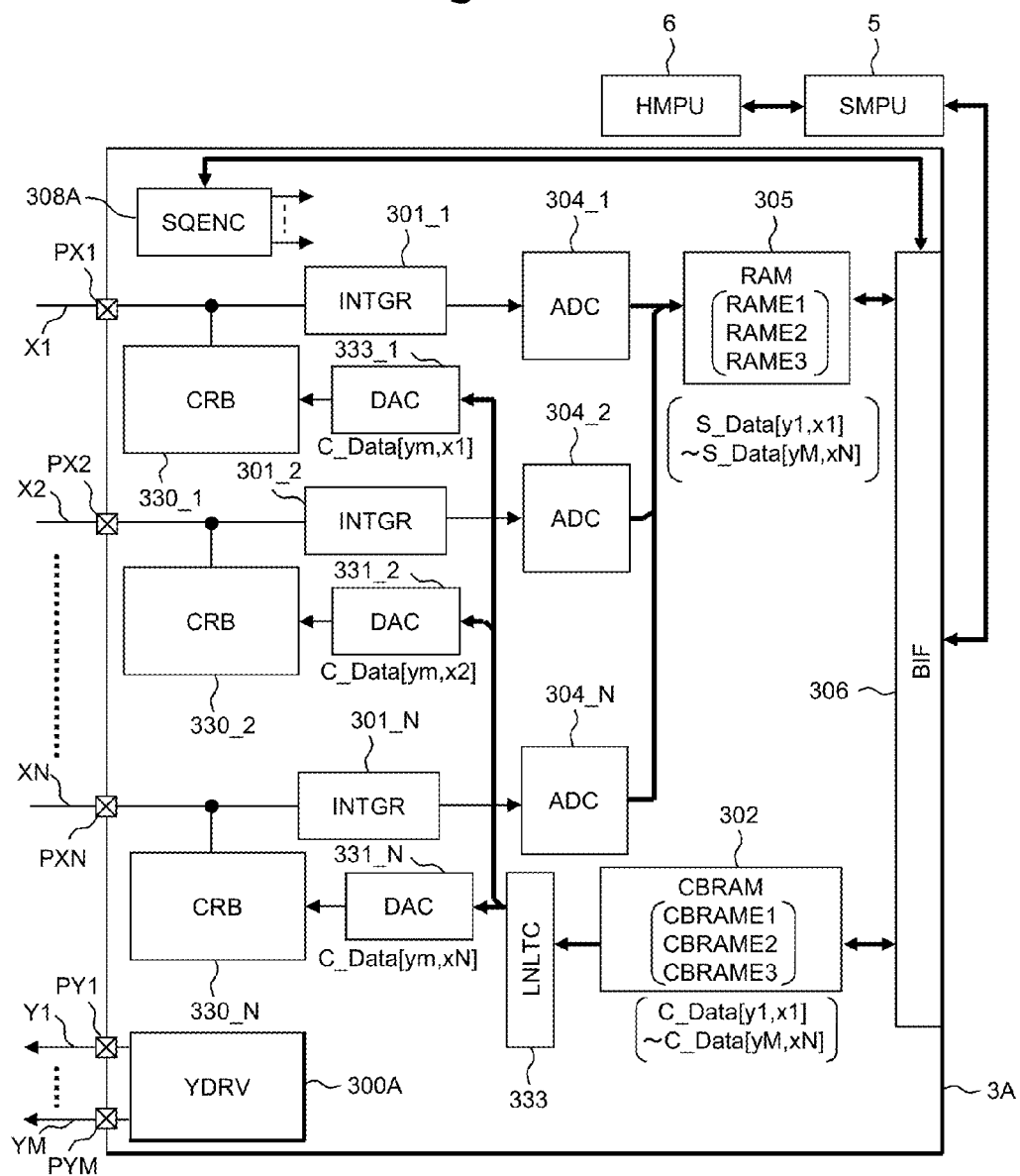
FIG. 24 is a block diagram exemplifying the structure of a touch panel controller (TPC) 3A suitable for the materialization of the countermeasure against AC charger noise in connection with the second embodiment.

FIG. 24 exemplifies the structure of the touch panel controller (TPC) 3A suitable for materialization of the countermeasure against AC charger noise in connection with the second embodiment.

The drive circuit 300A has two or more kinds of outputtable pulse widths for each kind of the pulse period of the outputtable drive pulse. Specifically, p kinds of high-level pulse widths are set for the drive pulse, and the touch detecting action is performed p times while switching the pulse width of the drive pulse. The p kinds of pulse widths are pulse widths selected from reciprocals of prime number multiples of the drive pulse frequency as described concerning the countermeasure against AC charger noise in connection with the first embodiment.

The reference numerals 301_1 to 301_N each represent an integration circuit, and 304_1 to 304_N each represent ADC; they are provided corresponding to the X-electrodes X1 to XN respectively. The reference numeral 308A represents a control circuit which controls the interior parts of the touch panel controller 3A following a direction from the subprocessor 5. In this embodiment, the touch detection is performed while switching the pulse width Wtx of the drive pulse. Since changing the drive pulse width Wtx varies the amount of signals input from the touch panel 1, the optimal setting of the calibration function for adjusting the output VOUT_1 to VOUT_N of the detection circuit to an appropriate level with no touch on the panel is changed. Therefore, as in the case of RAM 305 for detection data, memory regions CBRAME1, CBRAME2 and CBRAME3 are provided in the calibration RAM (CBRAM) for each setting of the pulse width Wtx of the drive pulse. The reference numeral 333 represents a line latch (LNLTC), to which calibration data are transmitted from CBRAM 332 for each detection electrode. The reference numerals 331_1 to 331_N each represent a digital-to-analog conversion circuit (DAC) which converts calibration data transferred to the line latch 333 into analog signals. The reference 330_1 to 330_N each represent a calibration circuit which applies calibration signals supplied from corresponding DACs 331_1 to 331_N to an input of the corresponding one of the integration circuits 301_1 to 301_N through a capacitance. Further, the reference character strings S_Data [y1,x1] to S_Data [yM,xN] represent detection data, and C_Data [y1, x1] to C_Data [yM, xN] represent calibration data.

The subprocessor 5 calculates coordinates based on detection data obtained as a result of performing the touch detecting action p times, and provides the host processor 6 with, as touch coordinates, the coordinates of a coordinate point on which the number of the resultant touch coordinates is minimum.

According to the countermeasure against AC charger noise in connection with the second embodiment, two or more kinds of drive pulses, which are produced by changing the drive pulse in pulse width, are output to each drive electrode, and detection data are created for each pulse width of the drive pulses on each crossing part of the drive electrodes and detection electrodes. Therefore, the subprocessor 5 can select, from detection data for each pulse width so created for each crossing part, one piece of detection data which is smaller in noise component, and make it optimal data. Now, it is noted that the one piece of detection data which is smaller in noise component refers to a piece of detection data on which the number of touch coordinates is minimum.

<<Countermeasure Against AC Charger Noise in Connection with Third Embodiment>>

Figure 25:
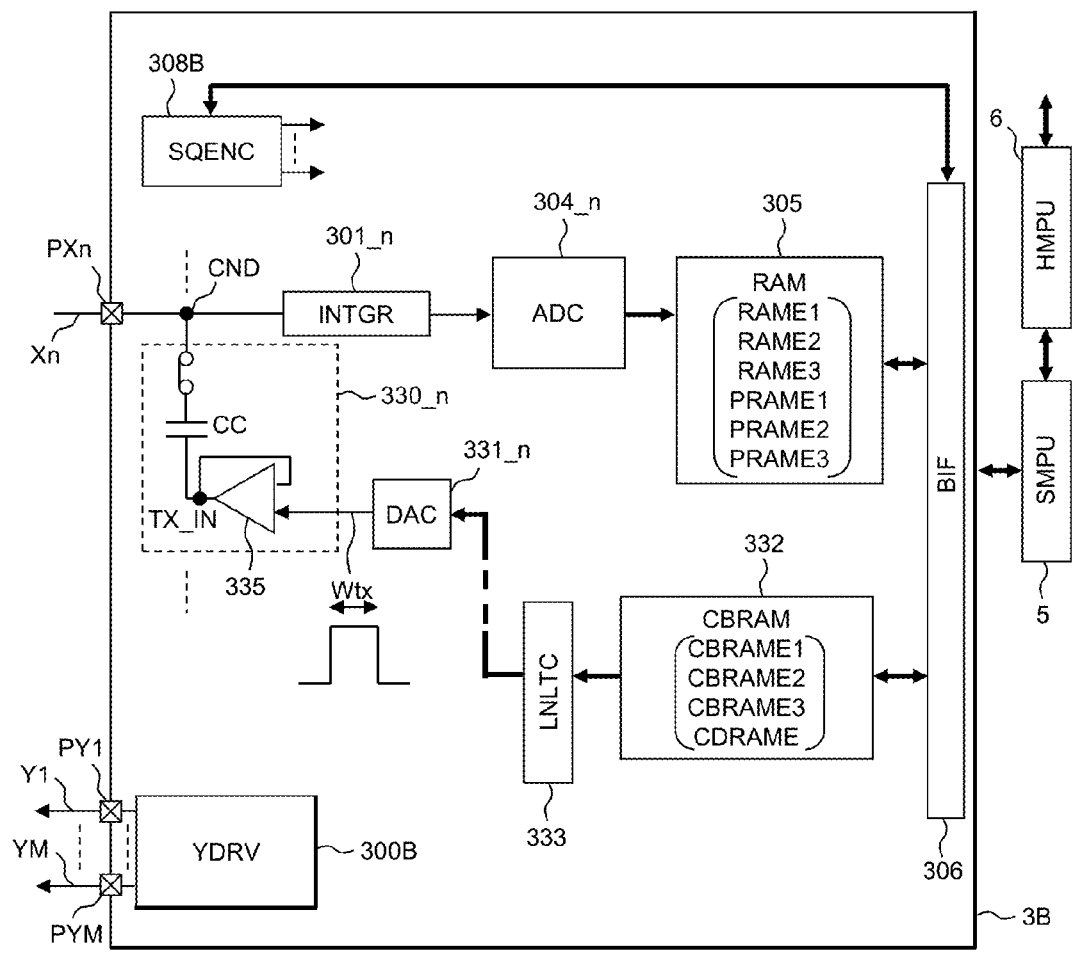
FIG. 25 is a block diagram exemplifying a partial structure of a touch panel controller (TPC) 3B suitable for the materialization of the countermeasure against AC charger noise in connection with the third embodiment.

FIG. 25 exemplifies a partial structure of a touch panel controller (TPC) 3B suitable for materialization of a countermeasure against AC charger noise in connection with the third embodiment. The countermeasure against AC charger noise is characterized as follows. In addition to the touch detection in which drive pulses are applied to the Y-electrodes of the touch panel 1, the pulse width of each drive pulses used in the detecting action is decided by performing a built-in capacitance detecting action for detecting a built-in capacitance inside the touch panel controller. Specifically, the built-in capacitance CC is set through a switch SW3 to a capacitance-connecting node CND in the input stage of the integration circuit 301_n, whereby an output pulse TX_IN of the buffer 335 can be applied to the capacitance-connecting node CND through the built-in capacitance CC. The output pulse of the buffer 335 has the same pulse width as that of a pulse which can be selected as the drive pulse. In the built-in capacitance detecting action, the switch SW3 is turned ON; and the buffer 335 is made to output a drive pulse; and the integration circuit is made to perform an integration as in the detecting action. The built-in capacitance CC is a capacitance inside the touch panel controller, and its capacitance value is known. With no input from the touch panel 1 through the Y-electrode, pseudo detection data corresponding to the known capacitance value is obtained as a result of detection of the built-in capacitance CC. In contrast, if the buildup of AC charger noise on the signal occurs, pseudo detection data different from the known capacitance value is obtained. Pulses having the same pulse widths as those of pulses which can be selected as the drive pulse are output from the buffer 335 in turn, and thus pseudo detection data are obtained. The subprocessor 5 makes a judgment on whether or not pseudo detection data for each pulse width corresponds to a capacitance value which is an expected value. Then, the subprocessor specifies, as a pulse width for the normal detecting action, the pulse width used when pseudo detection data corresponding to the expected value or substantially corresponding thereto has been obtained. The touch sensor controller uses the specified pulse width for a drive pulse in the current detecting action. The detecting action and the built-in capacitance detecting action are executed e.g. in units of touch panel frames, namely in units of action cycles of sequentially driving all the drive electrodes Y1 to YM assigned to the top to bottom parts of the touch panel; the pulse width of the drive pulse is determined each time the combination of the usual detecting action and the built-in capacitance detecting action are executed. Therefore, in the third embodiment, the pulse width of the drive pulse is switched at least in units of frames.

Although no special restriction is intended, the calibration circuit as described with reference to FIG. 24 may be arranged to additionally have the functions of the switch SW3, the capacitance CC, and the buffer 335, and substituted for them. To an input of the buffer 335, DAC 331_n is connected. To an input of the DAC 331_n, an output of a line latch (LNLTC) 333 is connected. To the calibration RAM 332, a pulse-data-storing regions CDRAME is added corresponding to a pulse width used for the built-in capacitance detecting action. Further, to RAM 305, memory regions PRAME1, PRAME2 and PRAME3 for storing pseudo detection data according to the pulse widths are added.

The drive circuit 300B uses the drive data of the pulse width determined based on the pseudo detection data by the subprocessor 5 to drive the drive electrodes.

The other parts of the structure of the touch panel controller are the same as those described with reference to FIG. 24 and therefore, the detailed descriptions thereof are omitted here.

Figure 26:
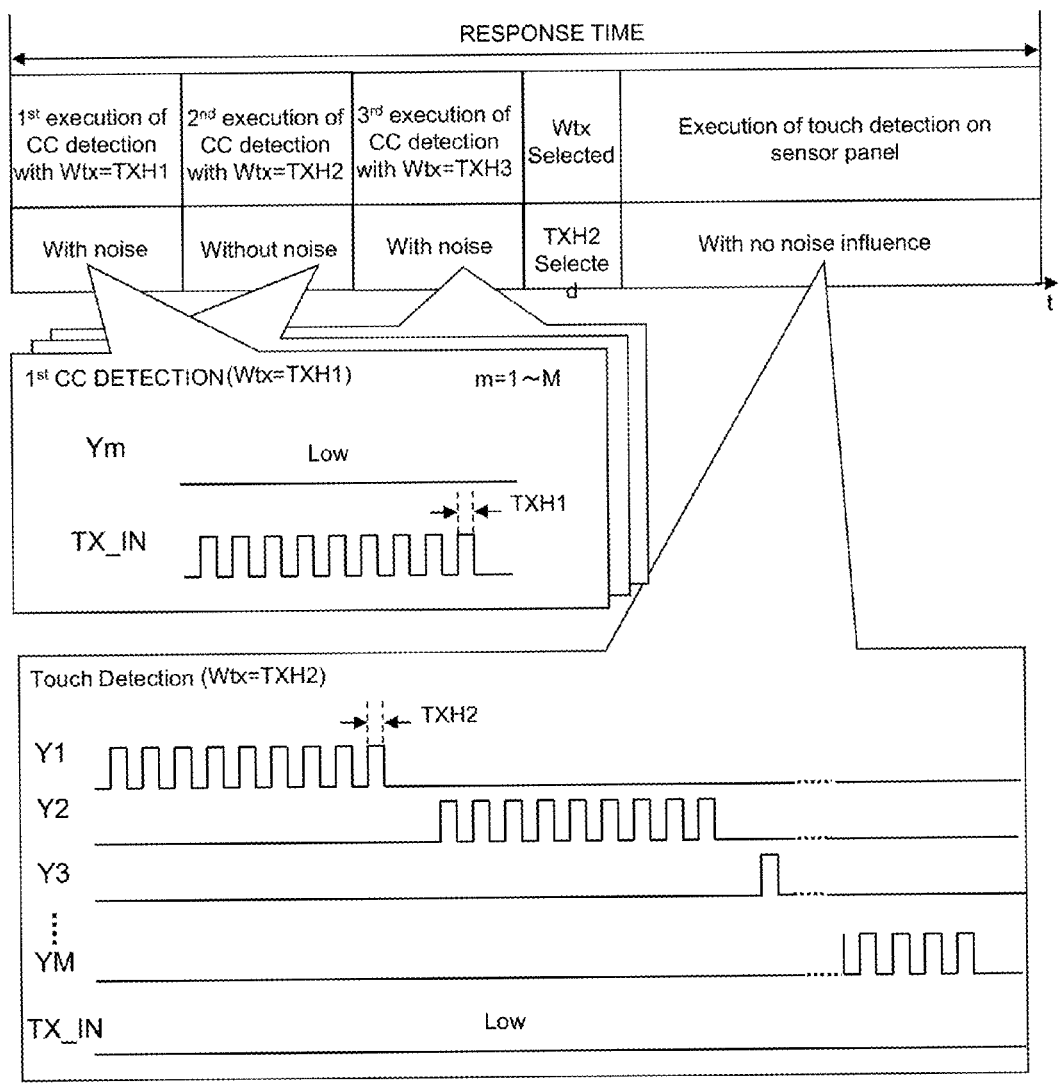
FIG. 26 is an explanatory diagram for explaining an action according to the countermeasure against AC charger noise in connection with the third embodiment.

Referring to FIG. 26, an action according to the countermeasure against AC charger noise in connection with the third embodiment will be exemplified. First, the action of detecting the built-in capacitance CC is performed with p kinds of pulse widths Wtx of the drive pulses. In the example shown in FIG. 26, the built-in capacitance CC is detected on the conditions that p=3, and Wtx=TXH1, TXH2, TXH3. It is assumed that in detecting the built-in capacitance CC, no drive pulse is applied to the drive electrodes Y1 to YM of the touch panel 1, and the drive electrodes remain fixed at its low level.

Next, based on pseudo detection data taken when Wtx=TXH1, TXH2, TXH3, the subprocessor 5 decides the pulse width Wtx of the drive pulse to be used in the detecting action. According to the decision, the drive circuit 300B selects the pulse width of the drive pulse.

Then, the touch detecting action is performed, in which the drive pulse is applied to the drive electrodes of the touch panel 1 in turn while using the selected pulse width Wtx. In the example shown in FIG. 26, Wtx=TXH2 is selected.

Now, it is noted that the detection time of the built-in capacitance CC is 1/M (M: the number of drive electrodes) of the touch-detection time of the touch panel 1, and the countermeasure against AC charger noise in connection with the third embodiment is finished in a shorter time in comparison to the countermeasure against AC charger noise in connection with the second embodiment.

Figure 27:
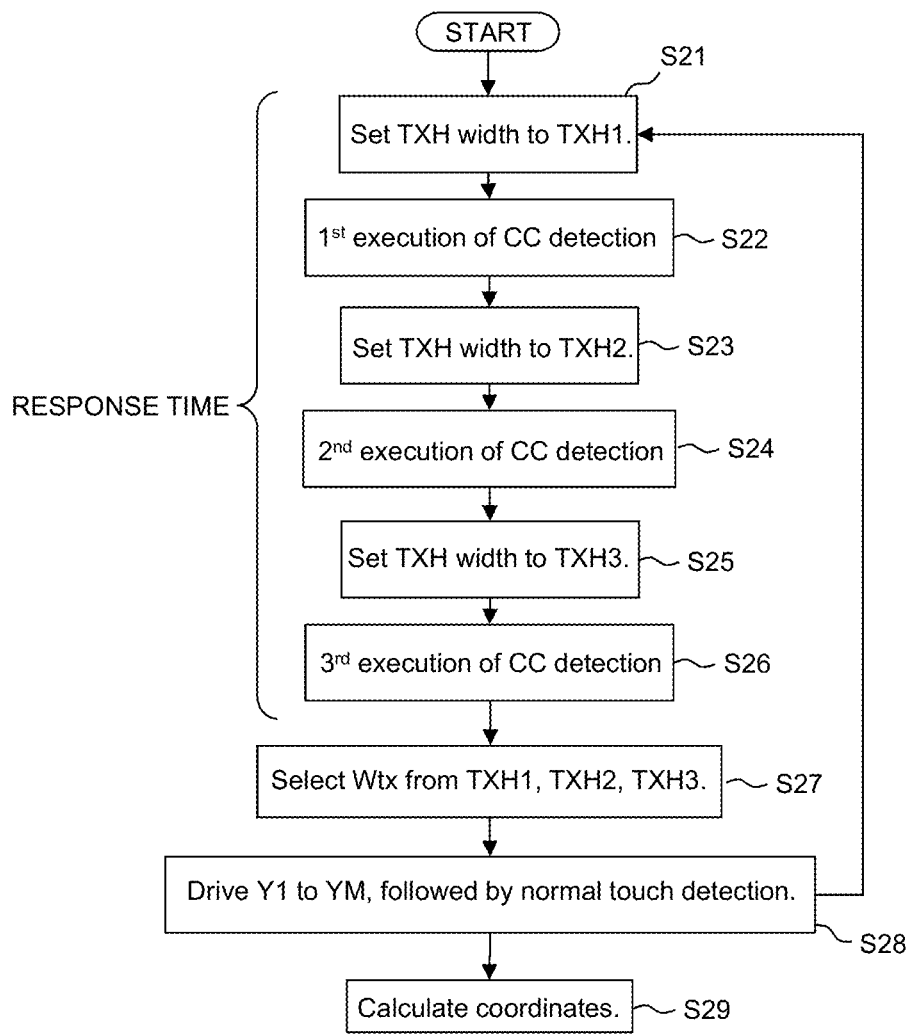
FIG. 27 is a flow chart of the action according to the countermeasure against AC charger noise in connection with the third embodiment.

FIG. 27 is a flow chart which exemplifies an action according to the countermeasure against AC charger noise in connection with the third embodiment. The action of detecting the built-in capacitance CC is executed while switching the pulse width Wtx among TXH1, TXH2, TXH3 (S21 to S26); the touch detection (S22, S24, S26) may be performed with the same pulse width Wtx as the pulse width of a selectable drive pulse once. Therefore, the memory regions PRAME1, PRAME2, PRAME3 for storing pseudo detection data may be much smaller than the memory regions RAME1, RAME2, RAME3 for storing detection data. The subprocessor 5 decides, based on pseudo detection data taken when Wtx=TXH1, TXH2, TXH3, the pulse width Wtx of a drive pulse to be used in the detecting action (S27). Using the decided pulse width Wtx, the drive circuit 300B applies a drive pulse to the drive electrodes Y1 to YM of the touch panel 1 in turn while the touch detecting action is performed (S28). The combination of the built-in capacitance detecting action and the detecting action in the steps S21 to S28 is repeated for each frame of the touch panel, for example. The detection data obtained for each frame of the touch panel are supplied to the subprocessor 5 and used for the calculation of touch coordinates by the subprocessor 5 (S29).

Figure 28:
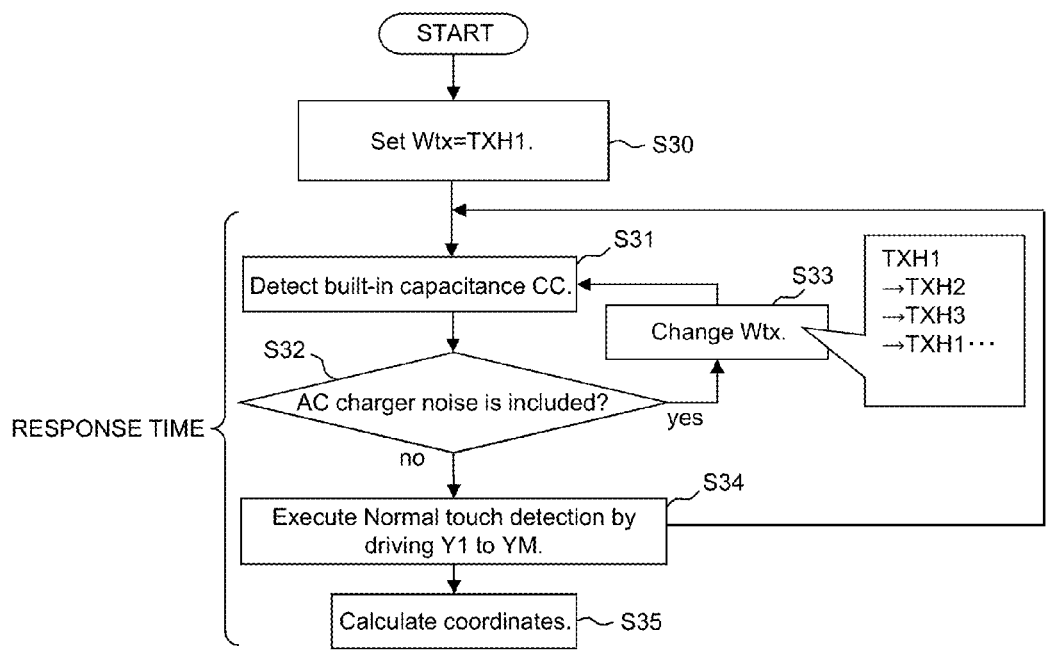
FIG. 28 is another flow chart of the action according to the countermeasure against AC charger noise in connection with the third embodiment.

FIG. 28 is another flow chart which exemplifies an action according to the countermeasure against AC charger noise in connection with the third embodiment. In the countermeasure of FIG. 27 the built-in capacitance CC is detected three times within a response time while switching the pulse width Wtx, whereas the countermeasure of FIG. 28 is an improvement of the countermeasure as described with reference to FIG. 27, in which the detection time of the built-in capacitance CC is made shorter. Specifically, if it is judged at the 1st detection of the built-in capacitance CC (with the pulse width Wtx=TXH1) (S30, S31, S32) that no AC charger noise has been built up, the pulse width Wtx=TXH1 is selected to perform the touch detection (S34). If it is judged at the 1st detection that the AC charger noise has been built up, the pulse width Wtx is switched, followed by the 2nd detection of the built-in capacitance CC. If it is judged at the 2nd detection of the built-in capacitance CC (with the pulse width Wtx=TXH2) (S33, S31, S32) that no AC charger noise has been built up, the pulse width Wtx=TXH2 is selected to perform the touch detection (S34). If it is judged at the 2nd detection that the AC charger noise has been built up, followed by the 3rd detection of the built-in capacitance CC. If it is detected at the 3rd detection of the built-in capacitance CC (with the pulse width Wtx=TXH3) (S33, S31, S32) that no AC charger noise has been built up, the pulse width Wtx=TXH3 is selected to perform the touch detection (S34). In the touch detection of the step S34, the selected pulse width Wtx is used, and the drive circuit 300B applies the drive pulse to the drive electrodes Y1 to YM of the touch panel 1 in turn. The combination of the built-in capacitance detecting action and the detecting action of the steps S30 to S34 is repeated for each frame of the touch panel, for example. The detection data obtained for each frame of the touch panel are supplied to the subprocessor 5, and used for the calculation of touch coordinates by the subprocessor (S35). According to the action flow as shown in FIG. 28, the detection time of the built-in capacitance CC can be shortened up to one-third. Incidentally, also in this case, the memory regions of RAM for storing pseudo detection data may be smaller as in the example shown in FIG. 27.

According to the countermeasure against AC charger noise in connection with the third embodiment, when previously supplied with more than one kind of pulses through the capacitance-connecting node CND connected to the input stage of the integration circuit 301_n, the subprocessor 5 operable to process detection data can decide an optimal pulse width which achieves a smaller noise component by use of data detected in a spurious way, and can operate the drive circuit to output a drive pulse having the pulse width thus decided to drive electrodes from drive terminals. Especially, the capacitance value of the capacitance-connecting node CND is known and as such, a judgment on whether or not there is the influence of the AC charger noise voltage Vfng added to pseudo detection data periodically or as cumulated can be made with relative ease in comparison to the case of the second embodiment. In addition, the detection time of the built-in capacitance CC is roughly 1/M (M is the number of the drive electrodes) of the touch-detection time of the touch panel 1 and as such, the detection of the built-in capacitance can be finished in a shorter time. Hence, in the case of FIG. 28, the detection time of the built-in capacitance CC can be shortened to one-third of that in the case of FIG. 27.

The invention is not limited to the above embodiments. It is obvious that various changes and modification may be made without departing from the subject matter thereof.

For instance, the number of kinds of pulse widths of selectable drive pulses is not limited to three, and the number may be changed appropriately. The two or more pulse widths are not necessarily in the prime-number relation, and they may be in a relation approximate to the relation. Both the touch panel controller and the display controller may be formed in one chip. Further, the touch panel controller and the subprocessor may be formed in one chip. The host processor may be used in place of the subprocessor. The structure for the countermeasure against AC charger noise in connection with the third embodiment is not limited to an embodiment wherein the calibration circuit is diverted. This is because the calibration circuit does not necessarily involve the structure in which the calibration circuit is capacitively coupled to the input node of the integration circuit. In addition, the action of detecting the built-in capacitance CC in the countermeasure against AC charger noise in connection with the third embodiment is not limited to the embodiment that the action of detecting the built-in capacitance CC is performed for each frame of the touch panel. The action of detecting the built-in capacitance CC may be performed with a shorter cycle. The action of detecting the built-in capacitance CC may be performed in longer period than one frame if allowable.

What is claimed is:

1. A semiconductor device comprising:
    a touch panel controller for a touch panel having a plurality of drive electrodes, a plurality of detection electrodes, and a plurality of crossing parts formed by the drive and detection electrodes, the touch panel controller comprising
        a drive circuit which outputs drive pulses to drive terminals connected to the drive electrodes respectively in a predetermined order; and
        a detection circuit which accepts signals arising from the detection electrodes in response to the drive pulses supplied to the drive electrodes, as inputs through detection terminals connected to the detection electrodes, and produces detection data corresponding to a fluctuation in capacitive coupling state at each crossing part,
    a capacitance-connecting node at which an output of a buffer is connected to an input stage of the detection circuit through a capacitance; and
    a control circuit,
    wherein the drive circuit has more than one kind of outputtable pulse width for each kind of pulse signal period of the outputtable drive pulses, and
    wherein before outputting the drive pulses to the drive terminals, the control circuit controls the buffer to output more than one kind of pulse having the same pulse width as those of the drive pulses, controls the detection circuit to produce pseudo detection data in response to signals supplied through the capacitance-connecting node, and controls the drive circuit to output a drive pulse having a pulse width decided based on the pseudo detection data.

2. The semiconductor device according to claim 1, further comprising:
    a display controller which outputs a scan pulse to each scan electrode of an active matrix type display panel and a signal voltage to each signal electrode thereof, provided that the active matrix type display panel has a plurality of scan electrodes, a plurality of signal electrodes, and a plurality of display cells each disposed at an intersection of the scan and signal electrodes,
    wherein a period of the drive pulse and a pulse width thereof are determined so that the drive pulse does not coincide with the scan pulse in pulse-change timing.

3. The semiconductor device according to claim 1,
    wherein the capacitance-connecting node is also used as an addition node for adding up, for each crossing part, calibration signals for equalizing reference values of conversion targets, with respect to a conversion range of a conversion circuit operable to convert an input signal of the detection circuit into a digital signal.

4. The semiconductor device according to claim 3, further comprising:
    a display controller which outputs a scan pulse to each scan electrode of an active matrix type display panel and a signal voltage to each signal electrode thereof, provided that the active matrix type display panel has a plurality of scan electrodes, a plurality of signal electrodes, and a plurality of display cells each disposed at an intersection of the scan and signal electrodes,
    wherein a period of the drive pulse and a pulse width thereof are determined so that the drive pulse does not coincide with the scan pulse in pulse-change timing.

5. The semiconductor device according to claim 1,
    wherein the control circuit controls the drive circuit to go through a circuit of drive pulse outputs to all the drive terminals, and forces the detection circuit to create the pseudo detection data for each detection frame for creating detection data on all the crossing parts.

6. The semiconductor device according to claim 5, further comprising:
    a display controller which outputs a scan pulse to each scan electrode of an active matrix type display panel and a signal voltage to each signal electrode thereof, provided that the active matrix type display panel has a plurality of scan electrodes, a plurality of signal electrodes, and a plurality of display cells each disposed at an intersection of the scan and signal electrodes,
    wherein a period of the drive pulse and a pulse width thereof are determined so that the drive pulse does not coincide with the scan pulse in pulse-change timing.

7. An electronic device comprising:
    a touch panel controller for a touch panel having a plurality of drive electrodes, a plurality of detection electrodes, and a plurality of crossing parts formed by the drive and detection electrodes; and
    a processor connected with the touch panel controller,
    wherein the touch panel controller includes
        a drive circuit which outputs drive pulses to drive terminals connected to the drive electrodes respectively in a predetermined order, and
        a detection circuit which accepts signals arising from the detection electrodes in response to the drive pulses supplied to the drive electrodes, as inputs through detection terminals connected to the detection electrodes, and produces detection data corresponding to a fluctuation in capacitive coupling state at each crossing part,
    wherein the drive circuit has more than one kind of outputtable pulse width for each kind of pulse signal period of the outputtable drive pulse,
    wherein the device further comprises
        a capacitance-connecting node at which an output of a buffer is connected to an input stage of the detection circuit through a capacitance; and
        a control circuit,
            wherein before outputting the drive pulses to the drive terminals, the control circuit controls the buffer to output more than one kind of pulse having the same pulse width as those of the drive pulses, and controls the detection circuit to produce pseudo detection data in response to signals supplied through the capacitance-connecting node, wherein the processor identifies the pulse width which minimizes a difference between the pseudo detection data detected by the detection circuit and data in the case of the capacitance having a predetermined value, and notifies the control circuit of the identified pulse width, and wherein the control circuit controls the drive circuit to output drive pulses with the pulse width notified to the drive circuit.

8. The electronic device according to claim 7, wherein the processor determines, based on detection data detected by the detection circuit, a capacitance change at each crossing part for each pulse width of the drive pulse, and uses detection data obtained by the pulse width to minimize the number of data involving a large fluctuation to calculate coordinates.

9. The electronic device according to claim 7, further comprising:

a display controller which outputs a scan pulse to each scan electrode of an active matrix type display panel and a signal voltage to each signal electrode thereof, provided that the active matrix type display panel has a plurality of scan electrodes, a plurality of signal electrodes, and a plurality of display cells each disposed at an intersection of the scan and signal electrodes, wherein a period of the drive pulse and a pulse width thereof are determined so that the drive pulse does not coincide with the scan pulse in pulse-change timing.

10. The electronic device according to claim 7, wherein the capacitance-connecting node is also used as an addition node for adding up, for each crossing part, calibration signals for equalizing reference values of conversion targets with respect to a conversion range of a conversion circuit operable to convert an input signal of the detection circuit into a digital signal.

11. The electronic device according to claim 10, further comprising:

a display controller which outputs a scan pulse to each scan electrode of an active matrix type display panel and a signal voltage to each signal electrode thereof, provided that the active matrix type display panel has a plurality of scan electrodes, a plurality of signal electrodes, and a plurality of display cells each disposed at an intersection of the scan and signal electrodes, wherein a period of the drive pulse and a pulse width thereof are determined so that the drive pulse does not coincide with the scan pulse in pulse-change timing.

12. The electronic device according to claim 7, wherein the control circuit controls the drive circuit to go through a circuit of drive pulse outputs to all the drive terminals, and forces the detection circuit to create the pseudo detection data for each detection frame for creating detection data on all the crossing parts.

13. The electronic device according to claim 12, further comprising:

a display controller which outputs a scan pulse to each scan electrode of an active matrix type display panel and a signal voltage to each signal electrode thereof, provided that the active matrix type display panel has a plurality of scan electrodes, a plurality of signal electrodes, and a plurality of display cells each disposed at an intersection of the scan and signal electrodes, wherein a period of the drive pulse and a pulse width thereof are determined so that the drive pulse does not coincide with the scan pulse in pulse-change timing.

\* \* \* \* \*